US008037478B2

(12) United States Patent
Tanaka et al.

(10) Patent No.: US 8,037,478 B2
(45) Date of Patent: Oct. 11, 2011

(54) OBJECT STATE TRANSFER METHOD, OBJECT STATE TRANSFER DEVICE, OBJECT STATE TRANSFER PROGRAM, AND RECORDING MEDIUM FOR THE PROGRAM

(75) Inventors: Shinji Tanaka, Tokyo (JP); Tetsuyasu Yamada, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 834 days.

(21) Appl. No.: 12/106,573

(22) Filed: Apr. 21, 2008

(65) Prior Publication Data

US 2008/0215587 A1    Sep. 4, 2008

Related U.S. Application Data

(62) Division of application No. 10/637,181, filed on Aug. 8, 2003, now Pat. No. 7,559,064.

(30) Foreign Application Priority Data

Aug. 14, 2002   (JP) ................................. 2002-236408

(51) Int. Cl.
*G06F 13/00*    (2006.01)
(52) U.S. Cl. ..................... 719/312; 719/316; 709/246
(58) Field of Classification Search .................. 719/312, 719/316; 709/246
See application file for complete search history.

(56) References Cited

U.S. PATENT DOCUMENTS

| 6,125,364 | A | 9/2000 | Greef et al. | |
|---|---|---|---|---|
| 6,330,709 | B1 | 12/2001 | Johnson et al. | |
| 6,345,276 | B1 * | 2/2002 | Lee ....................... | 1/1 |
| 6,360,363 | B1 | 3/2002 | Moser et al. | |
| 6,694,346 | B1 * | 2/2004 | Aman et al. .................. | 718/104 |
| 6,799,222 | B1 | 9/2004 | Endo et al. | |
| 7,035,870 | B2 * | 4/2006 | McGuire et al. .............. | 707/704 |
| 7,096,419 | B2 | 8/2006 | Barnes et al. | |
| 7,191,441 | B2 * | 3/2007 | Abbott et al. ..................... | 718/1 |

(Continued)

FOREIGN PATENT DOCUMENTS

EP    0967546    12/1999

(Continued)

OTHER PUBLICATIONS

Ann Wolrath, "Object Serialization", UNIX Magazine, vol. 15, No. 2, pp. 74-78, ASCII Corporation, Feb. 1, 2000 (CSDB: domestic technical magazine 200200189005).

(Continued)

*Primary Examiner* — Andy Ho
(74) *Attorney, Agent, or Firm* — Harness, Dickey & Pierce, P.L.C.

(57) ABSTRACT

When the states of a large number of objects must be transferred to another device, the overhead can be greatly reduced and the object states can be synchronized in a short period of time. At the time of creating an object, an object creation function arranges the internal state of the object into a byte sequence in a region for transfer, and sets mapping data in a mapping management table. When an application program has manipulated the internal state by using an accessor method, the state is set in the byte sequence in the region for transfer, or obtained therefrom. A transfer function transfers the byte sequence in the region for transfer and the mapping management table to a receiver, where a reproduction function reproduces the object based on the received data.

14 Claims, 21 Drawing Sheets

U.S. PATENT DOCUMENTS

| | | | |
|---|---|---|---|
| 7,526,750 B2 * | 4/2009 | Andrews et al. | 717/104 |
| 2002/0016814 A1 | 2/2002 | Convent et al. | |
| 2002/0116412 A1 | 8/2002 | Barnes et al. | |

FOREIGN PATENT DOCUMENTS

| | | |
|---|---|---|
| GB | 2353113 | 2/2001 |
| JP | 04242436 | 8/1992 |
| JP | 08328891 | 12/1996 |
| JP | 10040158 | 2/1998 |
| JP | 10-207849 | 8/1998 |
| JP | 10320206 | 12/1998 |
| JP | 2000029726 | 1/2000 |
| JP | 2001051861 | 2/2001 |
| JP | 2001051962 | 2/2001 |

OTHER PUBLICATIONS

επιστημη (episteme) "Object-Oriented Daily Life of επιστημη, Lecture 36, Persistency by PSE", Dr. Dobb's Journal Japan (DDJ), vol. 5, No. 12, pp. 130-140, Shoeisha Corporation, Dec. 1, 1996 (CSDB: domestic technical magazine 199700414016).

Shinji Tanaka et al., High Performance Data Sharing for JAVA:, 2002 IEICE Society Conference Paper 2, p. 59, B-6-35, The Institute of Electronics, Information, and Communication Engineers (IEICE), Aug. 20, 2002.

"Weblogic Server Cluster User's Guide", (see "Description of the Related Art" section in the background section of the present application).

Matt Welsh and David Culler; "Jaguar: Enabling Efficient Communication and I/O in Java"; Concurrency: Practice and Experience; vol. 12, Special Issue on Java for High-Performance Applications; Dec. 1999.

Fu, Mei-Mei, et al., "A Concurrent Programming Environment for Memory-Mapped Persistent Object Systems," Computer and Software Applications Conference, 1993, COMPSAC 93. Proceedings, Seventeenth Annual International, IEEE, Nov. 5, 1993, pp. 291-297.

* cited by examiner

OBJECT STATE TRANSFER METHOD, OBJECT STATE TRANSFER DEVICE, OBJECT STATE TRANSFER PROGRAM, AND RECORDING MEDIUM FOR THE PROGRAM

This application is a divisional of U.S. patent application Ser. No. 10/637,181 filed on Aug. 8, 2003, which has since matured into U.S. Pat. No. 7,559,064 issued on Jul. 7, 2009. The disclosure of the above application is incorporated herein by reference.

BACKGROUND OF THE INVENTION

1. Field of the Invention

This invention relates to a device incorporating a Java (registered trademark) virtual machine, and more particularly relates to an object state transfer method an object state transfer device, an object state transfer program, and a recording medium for the program which make it possible to reduce the overhead of transferring an object state to another host and to increase the capability of the overall system when synchronizing object states.

2. Description of the Related Art

In existing Java technology, to transfer the internal states (individual data for an object known as an instance variable) of a plurality of objects to an external device, the instances must be converted one by one into a byte sequence by a method known as serialization; the byte sequence is then transferred to the external device. This generates a large overhead when serializing. To perform serialization, the state of each individual member variable must be extracted by accessing each member variable which represents the internal state of each instance, and the extracted states must be copied to a region for transfer where the byte sequence is to be stored, consequently increasing the overhead.

For example, in a cluster comprised of a plurality of hosts, when one of the hosts comprising the cluster has for some reason become incapable of continuing service, another host continues to supply the service in its place, keeping the system reliable. For another host to take over supplying the service, data (object state) relating to the service must be replicated by synchronization between the hosts comprising the cluster.

Serialization is performed at such a time, and the internal states of the plurality of objects are converted into a byte sequence, which is transferred to the other host, but the resultant overhead greatly affects the performance of the overall system.

A system utilizing the abovementioned cluster configuration is described in a document published on the Internet (at URL: http://edocs.beasys.co.jp/e-docs/wls/docs70/cluster/failover.html); in this example, session takeover is achieved at failover by using serialization to replicate the session state.

In the conventional art described above, when a large amount of object states must be transferred, such as when synchronizing object states among a plurality of nodes (hosts) comprising a cluster in order to increase reliability, other processing becomes congested, leading to a considerable effect on the performance of the overall system.

SUMMARY OF THE INVENTION

It is an object of this invention to greatly reduce this overhead, to make it possible to synchronize the object states of a great number of objects in a short period of time, and to minimize the effect of this on the performance of the overall system, while increasing the reliability in the cluster configuration.

The most important characteristic of a first aspect of this invention is that internal states of objects, which are accessed by an application program in the same manner as conventional objects, are stored in a byte sequence.

More specifically, an application program is incorporated in a Java virtual machine or the like, and can access objects via an accessor method for manipulating the internal states of the objects; the internal states of the objects are mapped to a byte sequence, and transmitted in that form to an external device by a transfer unit.

Consequently, while the object can be manipulated from the application program in the same manner as conventional objects, an object whose internal state has been mapped in the byte sequence can be provided to the application program, enabling the overhead for transferring the object state to be greatly reduced, and the object can be reproduced at the transfer destination. Therefore, the device maintains high reliability with no reduction in its processing speed.

For example, when a data processing device has become unable to continue service, another data processing device takes over that service; to achieve this, the object internal states must be transferred to the other data processing device. Transfer processing should ideally be carried out each time the internal state of an object are updated, but since this would lead to an extremely high burden, transfer processing is actually carried out at regular intervals. In this invention, the overhead of transferring the internal states is greatly reduced, without interrupting other processing, and the internal states can be transferred to another data processing device more frequently than in conventional devices. This enables shortening a time interval for synchronization of internal states among a plurality of data processing devices, increasing the reliability of the overall system.

In a first aspect of the invention, in compliance with a request from the application program to create a new object, the internal state of the new object is secured in a byte sequence, mapping is performed between the byte sequence and the internal state of the new object, and mapping data relating to this mapping is stored in a mapping management table or the like.

In the first aspect of the invention, when the application program has accessed the internal state of the created object, in compliance with the mapping data stored in the mapping management table, the internal state of the object in the mapped byte sequence is set, or the internal state of the object is extracted from the mapped byte sequence, and the result is returned to the application program.

In the first aspect of the invention it is acceptable to transfer the byte sequence storing the internal state of the object and the mapping data stored in the mapping management table or the like in unaltered form to another data processing device.

In the first aspect of the invention, when the created object has been deemed unnecessary by the application program, and the Java virtual machine or the like is attempting to release the memory region relating to that object, it is acceptable to simultaneously cancel the mapping of the byte sequence and the object, and update the mapping data stored in the mapping management table or the like.

In the first aspect of the invention, an object may be reproduced by a reproduction unit in a data processing device based on the byte sequence and mapping data transferred by the transfer unit of another data processing device, and data relating to the reproduced object are then sent to the application program.

According to a second aspect of this invention, an object, which is shared among a plurality of data processing devices, is placed in a shared heap region as an object to be transferred to another data processing device, and the transfer unit transfers the shared heap region to the other data processing device.

Consequently, it is possible to store the shared object which can be manipulated in the same manner as conventional objects, and in addition, it is possible to provide the shared heap region which can be directly transferred by the data processing device on the transfer side and which can be reproduced by the data processing device on the reproduction side to the application program. Therefore, the overhead for transferring the internal states of objects to another data processing device can be greatly reduced, and the object can be reproduced at the transfer destination. Consequently, the device maintains high reliability with no reduction in its processing speed.

More specifically, it is determined whether the object is shared among a plurality of data processing devices; if shared, the object is stored in the shared heap region as a shared object; if not shared, the object is stored in the heap region. In this way, the application program can manipulate the internal states of ordinary objects and shared objects in the same way.

In the second aspect of this invention, it is acceptable that a transfer class is specified beforehand; when a request to create a new object has been given by the application program, it is determined whether the class to be created is contained in the transfer class; when the class to be created is not contained in the transfer class, an object is created in the heap region, and, when the class to be created is contained in the transfer class, a shared object is created in the shared heap region. This makes it possible to share only an object belonging to a specific class as a shared object among a plurality of data processing devices. Therefore, the amount of transfer data required to synchronize the plurality of data processing devices can be reduced.

In the second aspect of this invention, when the application program has issued a command to manipulate an internal state of the created object, it is acceptable to determine whether the object to be manipulated is stored in the shared heap region, based on an address of the object to be manipulated, supplied by the application program, and determine whether the manipulation comprises setting the internal state; when setting the internal state of an object stored in the shared heap region, a flag is set to show that, among the plurality of blocks comprising the shared heap region, the block where the object to be manipulated is stored has been updated.

In the second aspect of this invention, the whole of the shared heap region storing the internal states of the objects may be transmitted to another data processing device. This allows the shared heap region to be transferred unaltered to the other data processing device, reducing the transfer overhead.

In the second aspect of this invention, among the plurality of blocks, only the block whose flag is set to show that its corresponding block has been updated is transmitted to the other data processing device. This reduces the amount of transferred data, shortens the transmission time at the data processing device on the transmitting side and the receive time at the data processing device on the receiving side, and reduces the transferring and receiving overheads.

In the second aspect of this invention, it is acceptable that a shared heap region transferred from a data processing device is received by another data processing device, which arranges the content thereof to its own shared heap region, and calculates the difference between the address of the shared heap region on the transfer side with the address of the shared heap region on the receiving side; when a pointer of the shared object in the transferred shared heap region indicates a position inside the shared heap region on the transfer side, the pointer is corrected based on the difference between the addresses; when the pointer points to a position outside the shared heap region on the transfer side, the pointer is nullified; thereby reproducing the shared object. As a consequence, there is no longer any need to match the locations where the shared heap regions are stored among the plurality of data processing devices.

DETAILED DESCRIPTION OF THE PREFERRED EMBODIMENTS

Preferred embodiments of this invention will be described with reference to the accompanying diagrams.

First Embodiment

Figure 1:
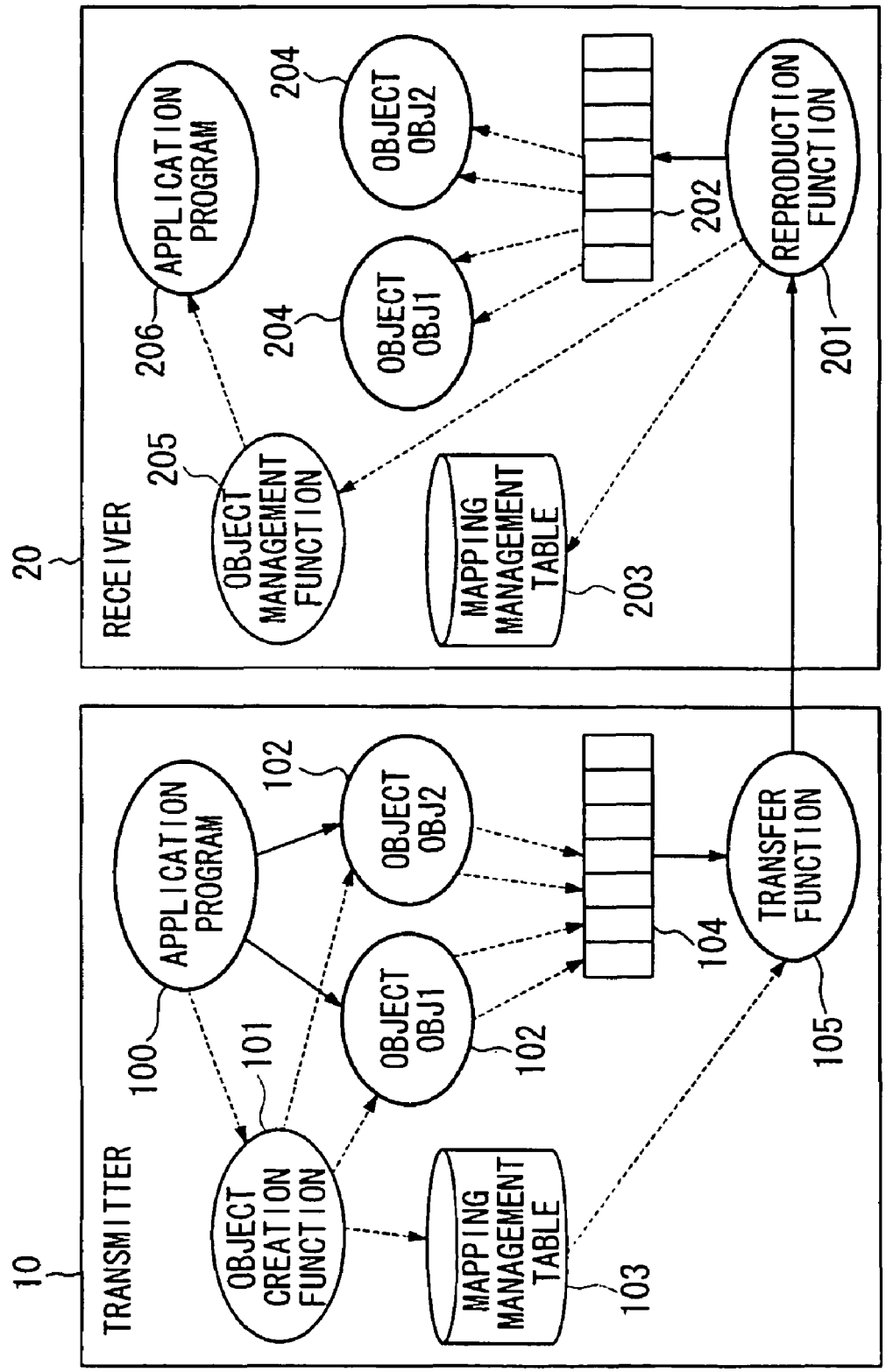
FIG. 1 is a diagram showing an example of the constitution of a system according to a first embodiment of this invention.

FIG. 1 is a diagram showing an example of the constitution of a system according to a first embodiment of this invention. A transmitter 10 is a computer incorporating a Java virtual machine, and transfers the internal state of an object. A receiver 20 is also a computer incorporating a Java virtual machine, and receives the internal states of objects from the transmitter 10, reproducing the objects based on the internal states it has received.

An object creation function 101 in the transmitter 10 creates an object 102 in accordance with an object creation command from an application program 100. At this time, the object creation function 101 arranges the internal state of the object 102, created in a predetermined region for transfer 104, into a byte sequence, and sets mapping data between the internal state of the new object 102 and the byte sequence in a mapping management table 103.

When the application program 100 accesses the internal state of the object 102 via an accessor method, the internal state of the object 102 is set in or extracted from the byte sequence in the region for transfer 104, which has been mapped in compliance with the data in the mapping management table 103, and returned to the application program 100. The accessor method is one type of interface prepared by the object 102 in order to enable the application program 100 to access the object 102: since the accessor method is not suitable for diagrammatic illustration, is not shown in FIG. 1.

In order to synchronize the internal states of the objects 102 created at the transmitter 10, a transfer function 105 regularly transfers these internal states to the receiver 20, and transmits the byte sequence in the region for transfer 104 and the mapping management table 103 in unaltered form to the receiver 20. The transfer function 105 is implemented as an object.

A reproduction function 201 in the receiver 20 sets the byte sequence from the transfer function 105 in a region for transfer 202 in the receiver 20, and, in addition, reflects the mapping data in the mapping management table 103 in a mapping management table 203 in the receiver 20. The reproduction function 201 extracts the internal state of each object from the received byte sequence in the region for transfer 202 and from the mapping management table 203, and reproduces an object 204 having the same internal state as the object 102 in the transmitter 10. The reproduction function 201 is implemented as an object.

An object management function 205 receives notification of the reproduction of the object 204 from the reproduction function 201, and notifies an application program 206 that the object has been reproduced.

Next, the various functions of the transmitter 10 and the receiver 20 will be explained in more detail.

Figure 2:
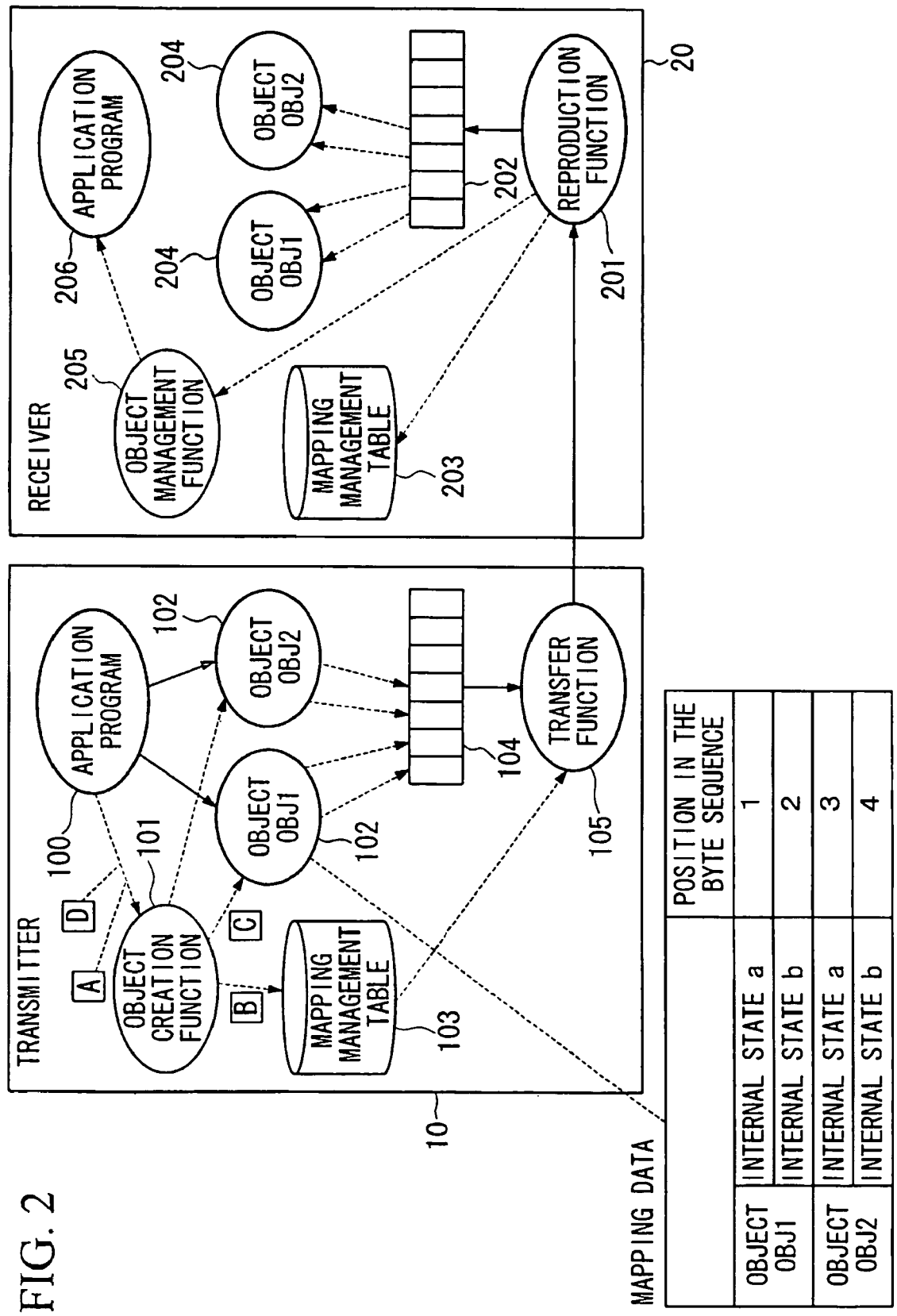
FIG. 2 is a diagram showing an example of an object creation process in the first embodiment of this invention.
Figure 3:
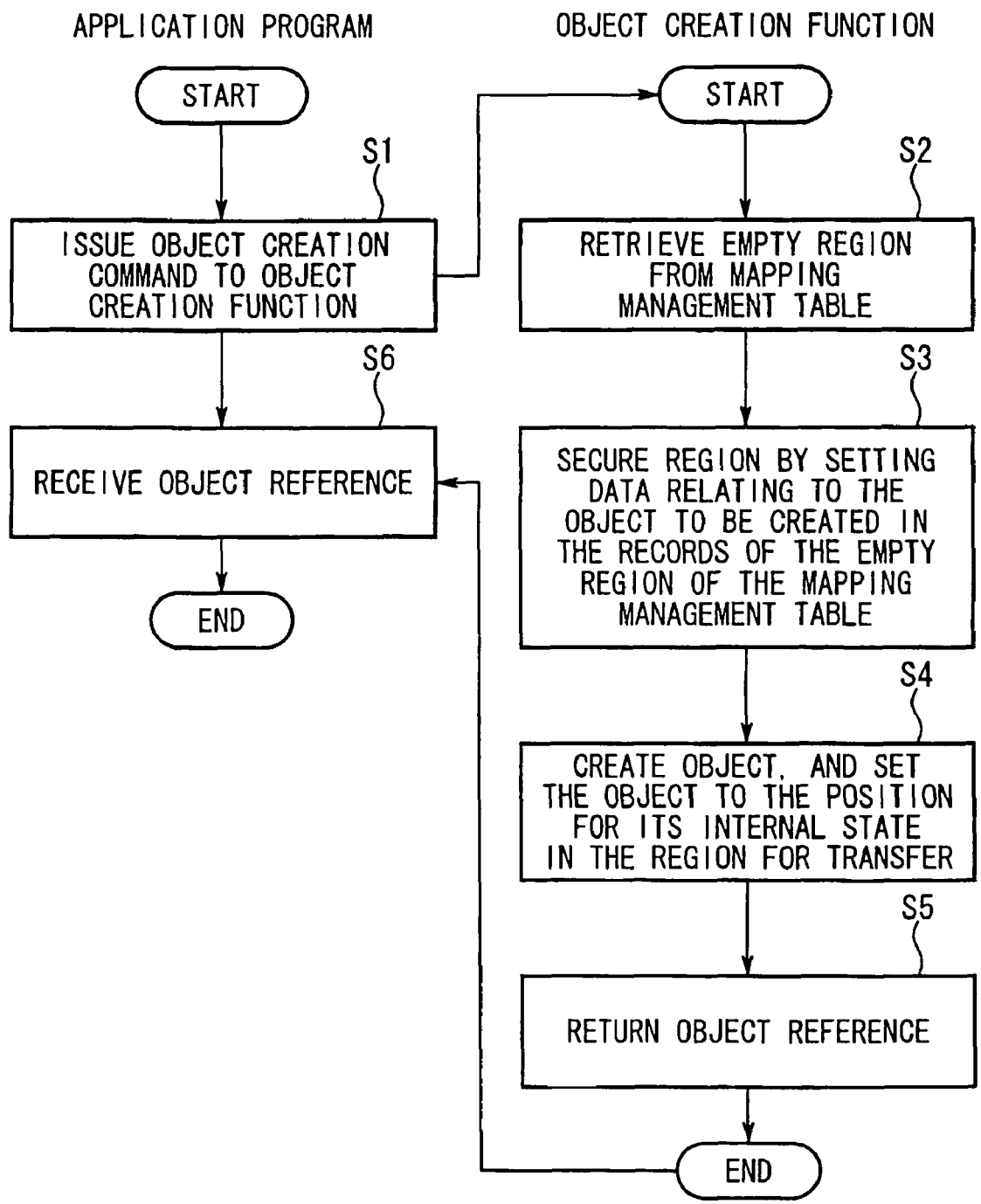
FIG. 3 is a flowchart of an object creation process in the first embodiment of this invention.

FIG. 2 shows an example of an object creation process in an embodiment according to this invention, and FIG. 3 is a flowchart of an object creation process. The flow of the processing will be explained in accordance with FIGS. 2 and 3.

(A) Object Creation Command

The application program 100 calls up the object creation method (e.g. createObject ( )) of the object creation function 101, and issues a command to create the object specified by the method (step S1).

(B) Obtaining Mapping Data

In response to the object creation command, the object creation function 101 performs mapping between the internal state of the object to be created and the byte sequence constituting the region for transfer 104. To do this, the object creation function 101 determines the number and type of the internal states of the object to be created, determines the size required, and retrieves for an empty region of the required size in the mapping management table 103 (step S2). Thereafter, the object creation function 101 records the positions of the internal states in the byte sequence in the mapping management table 103. That is, the object creation function 101 secures the region by setting data relating to the object to be created in the records of the empty region of the mapping management table 103 (step S3).

(C) Object Creation

Then, the object creation function 101 creates the object and sets the data of the mapping management table 103, stored in (B) above. That is, the object creation function 101 sets the created object to the position for its internal state in the region for transfer 104 (step S4).

(D) Object Reference Return

Thereafter, the object creation function 101 returns an object reference to the application program 100 (step S5). The application program 100 receives the object reference from the object creation function 101 (step S6). The object reference is used in handing over the object, and can be realized by a pointer for directly referring to the position where the object is stored. An alternative is to create a table of entries comprising pointers for directly specifying the position where objects are stored, and the object reference indirectly refers to the position where the object is stored by specifying one of the entries in the table. When the application program 100 has requested that the object creation function 101 creates an object, the object reference is returned in order to hand the object created by the object creation function 101 over to the application program 100.

Figure 4:
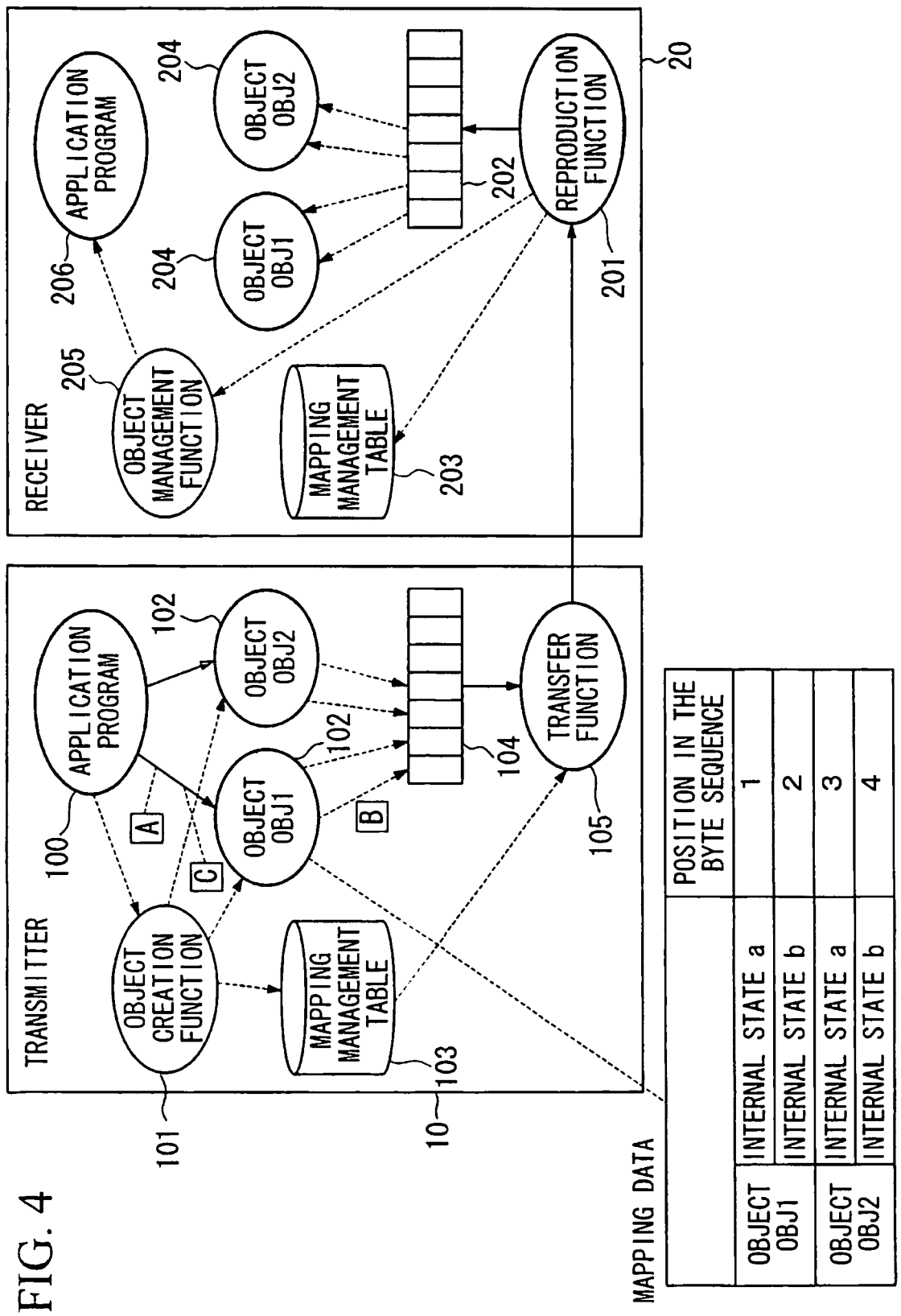
FIG. 4 is a diagram showing an example of an object manipulation process in the first embodiment of this invention.
Figure 5:
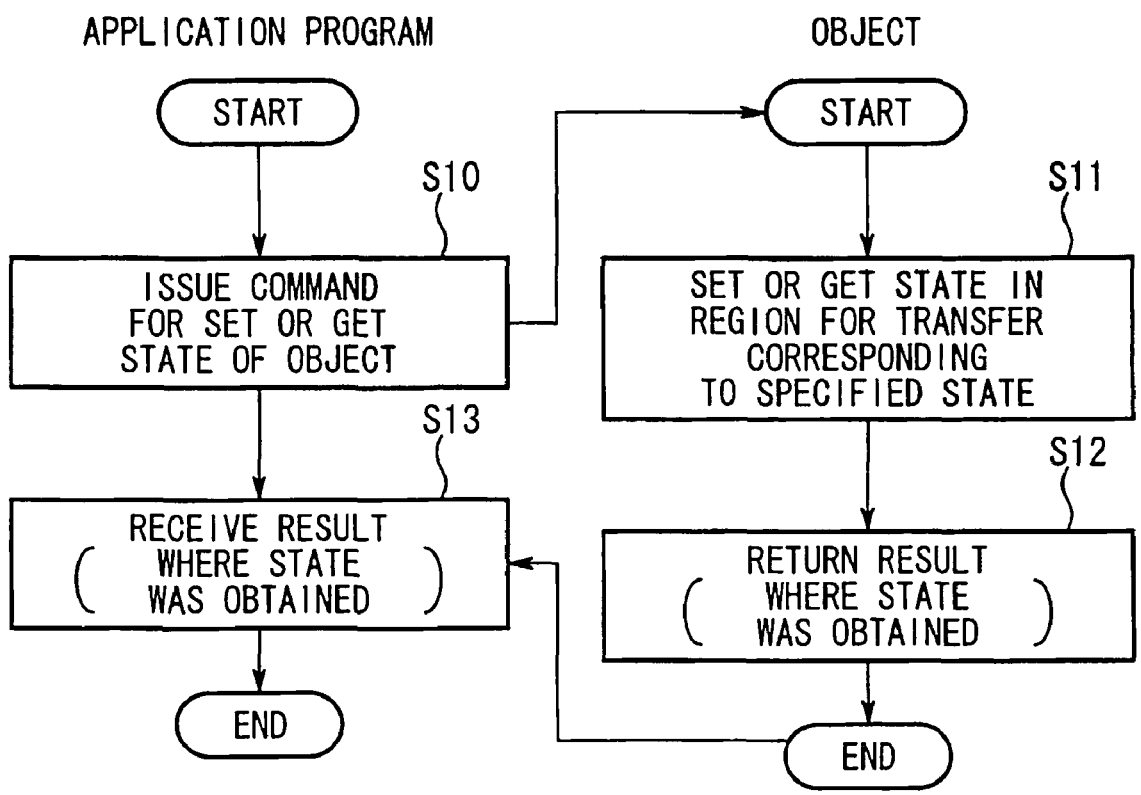
FIG. 5 is a flowchart of an object manipulation process in the first embodiment of this invention.

FIG. 4 is a diagram showing an example of an object manipulation process in the embodiment according to this invention, and FIG. 5 is a flowchart of the object manipulation process. The processing flow will be explained based on FIGS. 4 and 5.

(A) Object Manipulation Command

The application program 100 calls up the accessor method (e.g. setAttribute ( ), getAttibute( ) and the like) of the object 102, and thereby issues a command to perform a manipulation to the internal state of the object, in other words, to set or get the internal state (step S10).

(B) Setting and Getting Internal State of Object

The accessor method of the object 102 sets or gets the internal state of the object by accessing the byte sequence comprising the region for transfer 104, based on the mapping data to the byte sequence of the internal state of the object which was set for the object 102 at the time of its creation (step S11).

(C) Returning Result of Setting and Getting Internal State of Object

The object 102 returns the result of setting or getting to the application program 100. In particular, in the case of getting the internal state of the object, the object 102 returns the internal state to the application program 100 (step S12). The application program 100 receives the result (step S 13).

Figure 6:
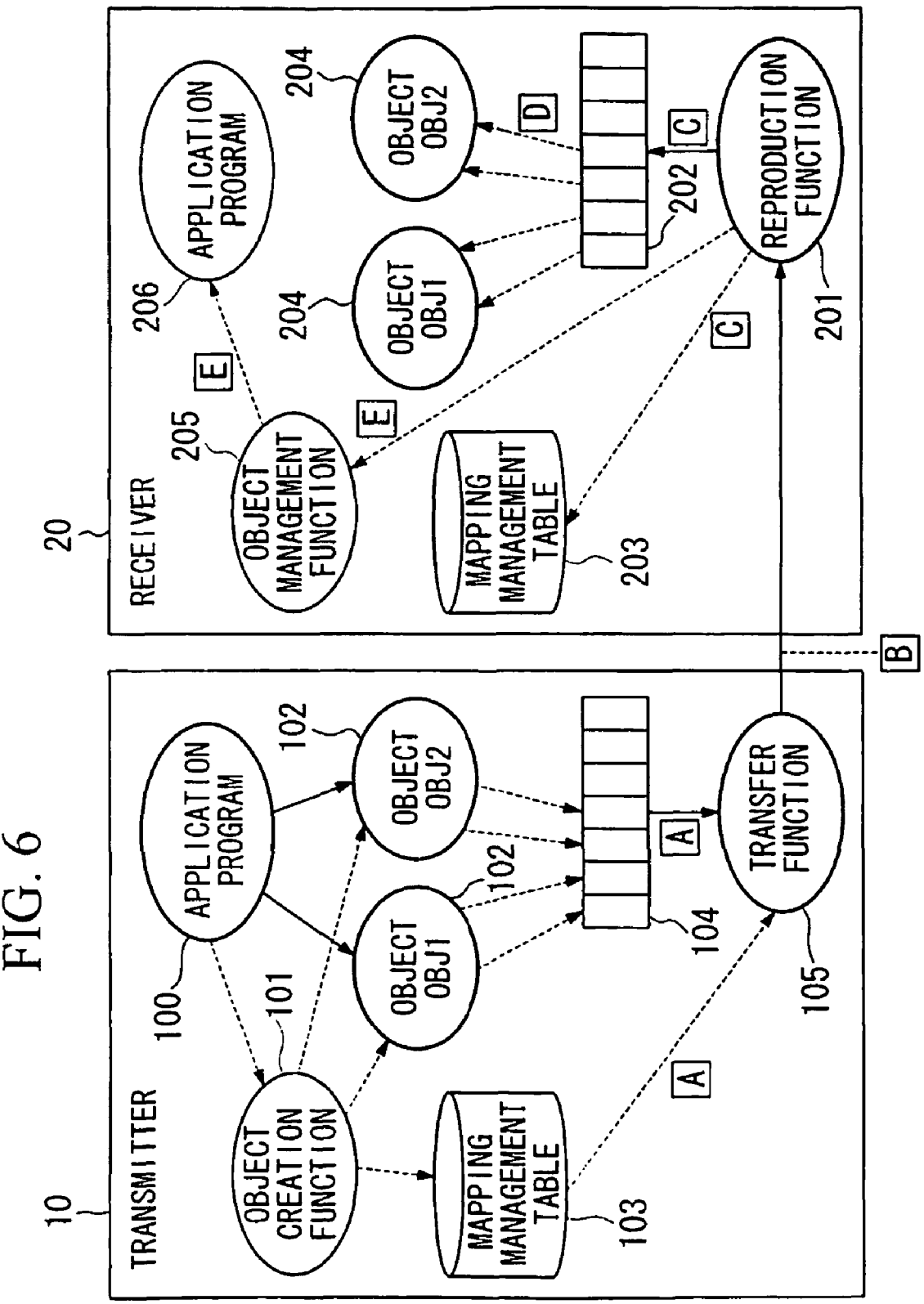
FIG. 6 is a diagram showing examples of object transfer and reproduction in the first embodiment of this invention.
Figure 7:
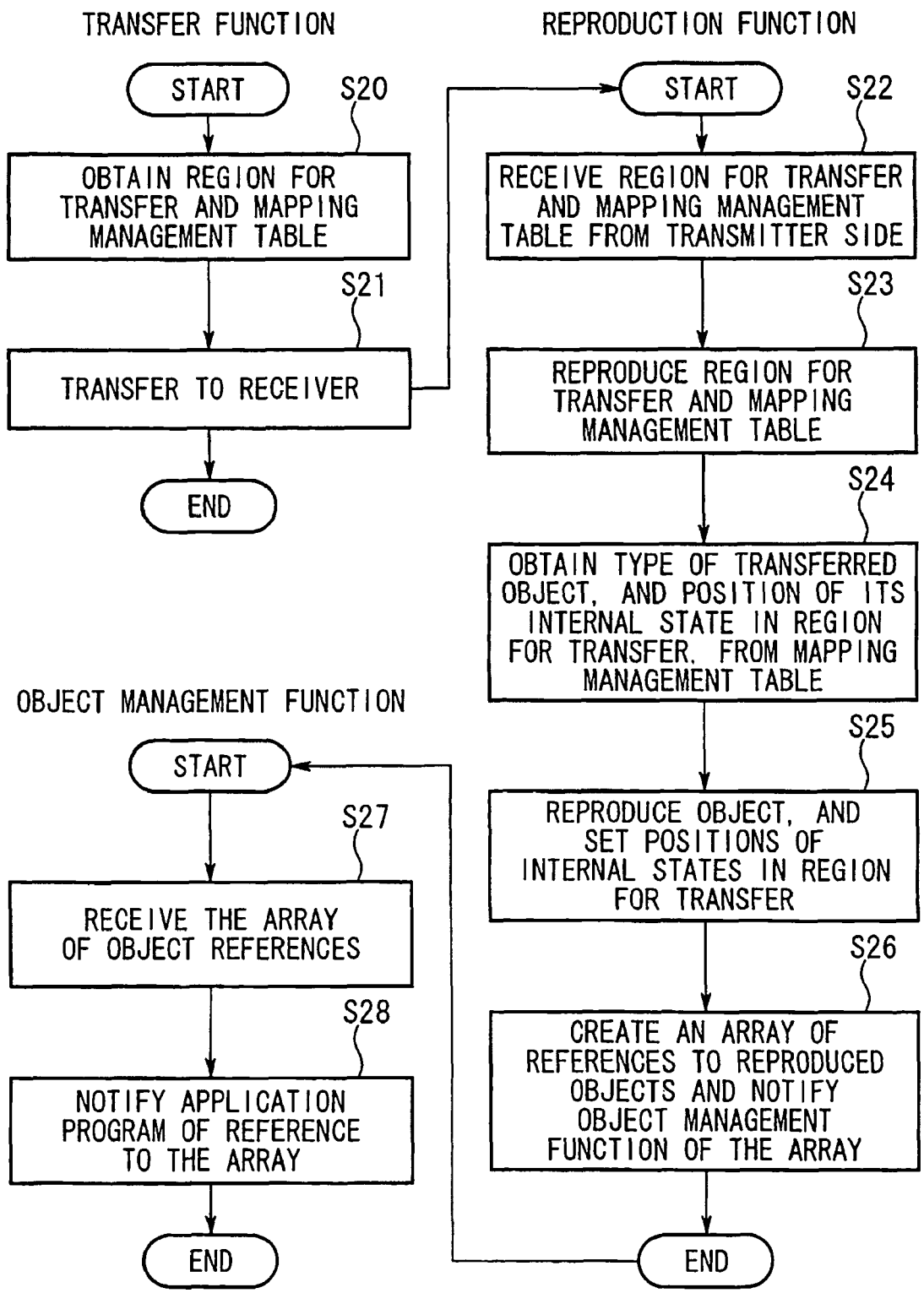
FIG. 7 is a flowchart of object transfer and reproduction processes in the first embodiment of this invention.

FIG. 6 is a diagram showing examples of object transfer and reproduction in the embodiment according to this invention, and FIG. 7 is a flowchart of object transfer and reproduction processes. The processing flow will be explained based on FIGS. 6 and 7.

(A) Obtaining Byte Sequence and Mapping Management Table

For example, to transfer the internal state of the object in the transmitter 10 to the receiver 20, the transfer function 105 starts regular transfer processing, and obtains data from the byte sequence comprising the region for transfer 104 and the mapping management table 103 (step S20).

(B) Data Transfer

The transfer function 105 transfers the obtained data to a reproduction function 201 of the receiver 20, comprising another host (step S21).

(C) Reproduction of Byte Sequence and Mapping Management Table

The reproduction function 201 receives the byte sequence which represents the internal state of the object and the data of the mapping management table 103 from the transmitter 10 (step S22), and reproduces them by setting them in the region for transfer 202 and the mapping management table 203 (step S23).

(D) Object Reproduction

Then, the reproduction function 201 obtains the type of the transferred object and the position of its internal state in the region for transfer 202 from the mapping management table 203 (step S24), and reproduces the object 204 based on the data of the mapping management table 203. Subsequently, the reproduction function 201 sets the data of the mapping management table 203 (such as the position of the internal state in the region for transfer 202) for each reproduced object 204 (step S25).

(E) Notification of Object Reproduction

The reproduction function 201 creates an array of the references to the reproduced objects 204, and notifies an object management function 205 of the array (step S26). The object management function 205 receives the array of the references to the objects 204 (step S27), and notifies a preregistered application program 206 of the reference to the array as reproduced data (step S28). The application program 206 performs post-reproduction processing where necessary.

Figure 8:
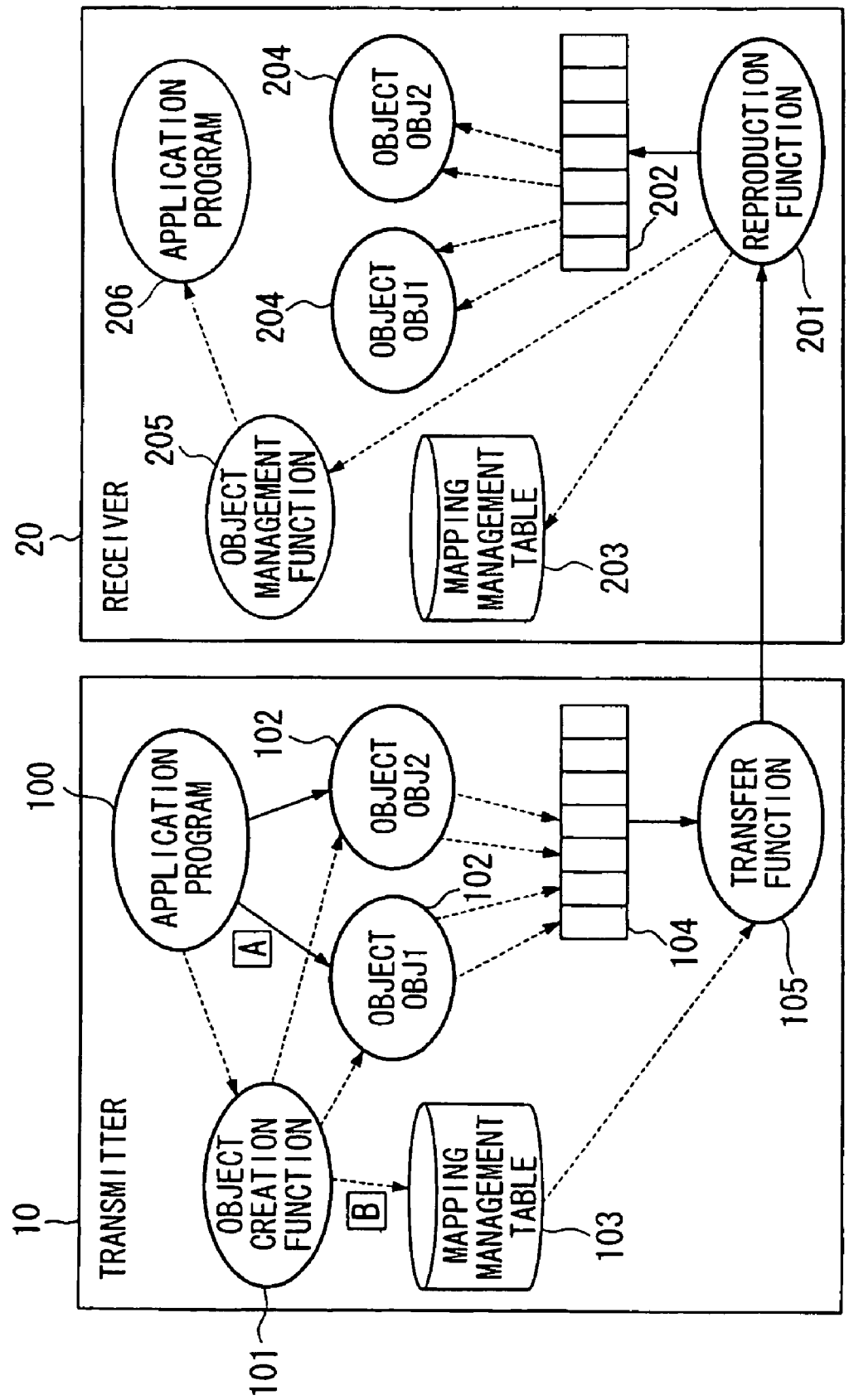
FIG. 8 is a diagram showing a process of deleting an object in the first embodiment of this invention.
Figure 9:
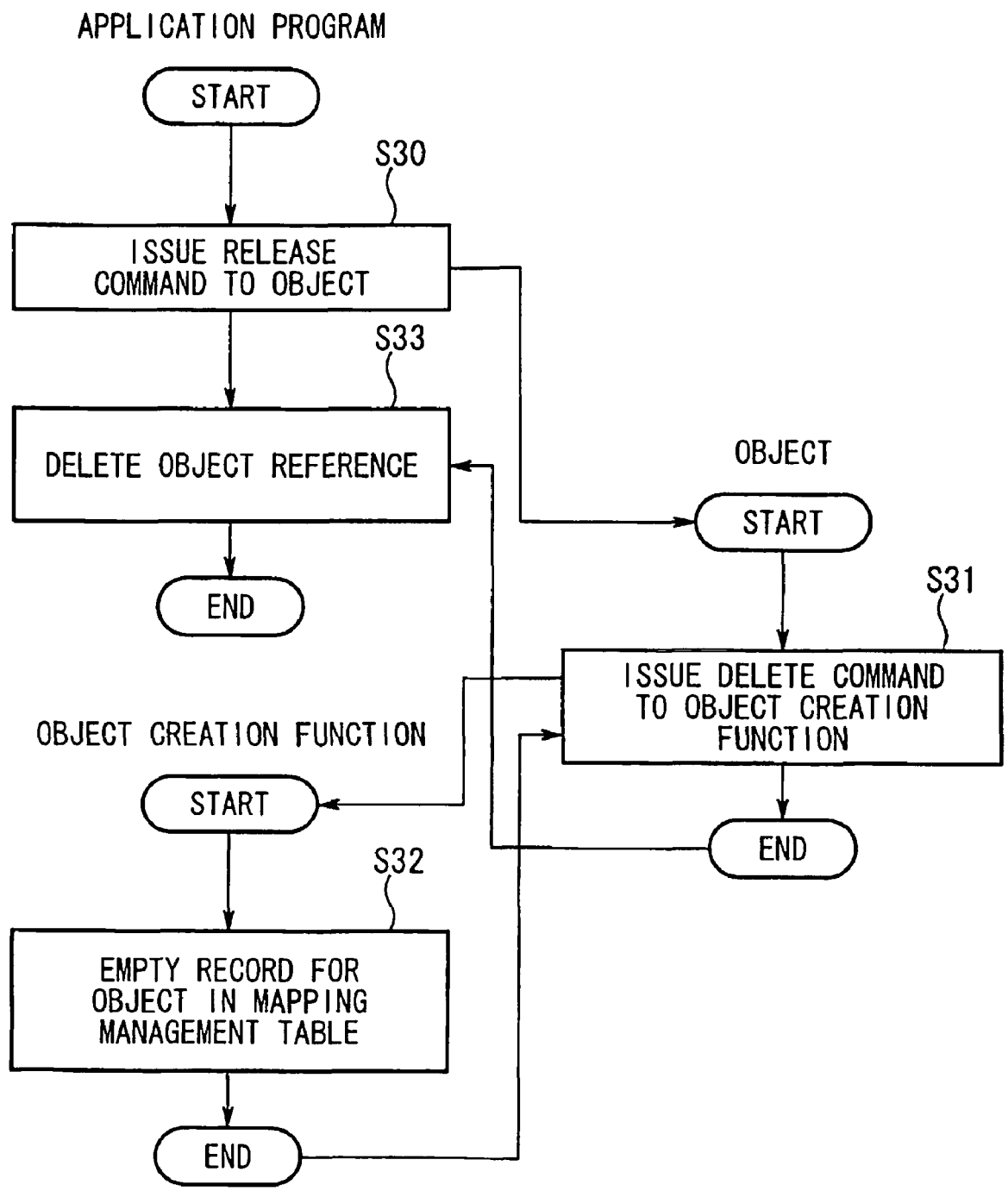
FIG. 9 is a flowchart of a process of deleting an object in the first embodiment of this invention.

FIG. 8 is a diagram showing a process of deleting an object in the embodiment according to this invention, and FIG. 9 is a flowchart of a process of deleting the object. The processing flow will be explained based on FIGS. 8 and 9.

(A) Object Release Command

The application program 100 calls up a releasing method for releasing an object which is no longer required., and thereby issues a command to release the object 102 (step S30).

(B) Clear Mapping Data

When the object 102 receives the release command, it instructs the object creation function 101 to delete (step S31). In compliance with the delete command from the object 102, the object creation function 101 empties the region in the mapping management table 103 where records for the object 102 are stored, thereby clearing the mapping data (step S32). The application program 100 deletes the object reference relating to the object for which the release command has been issued (step S33).

Figure 10:
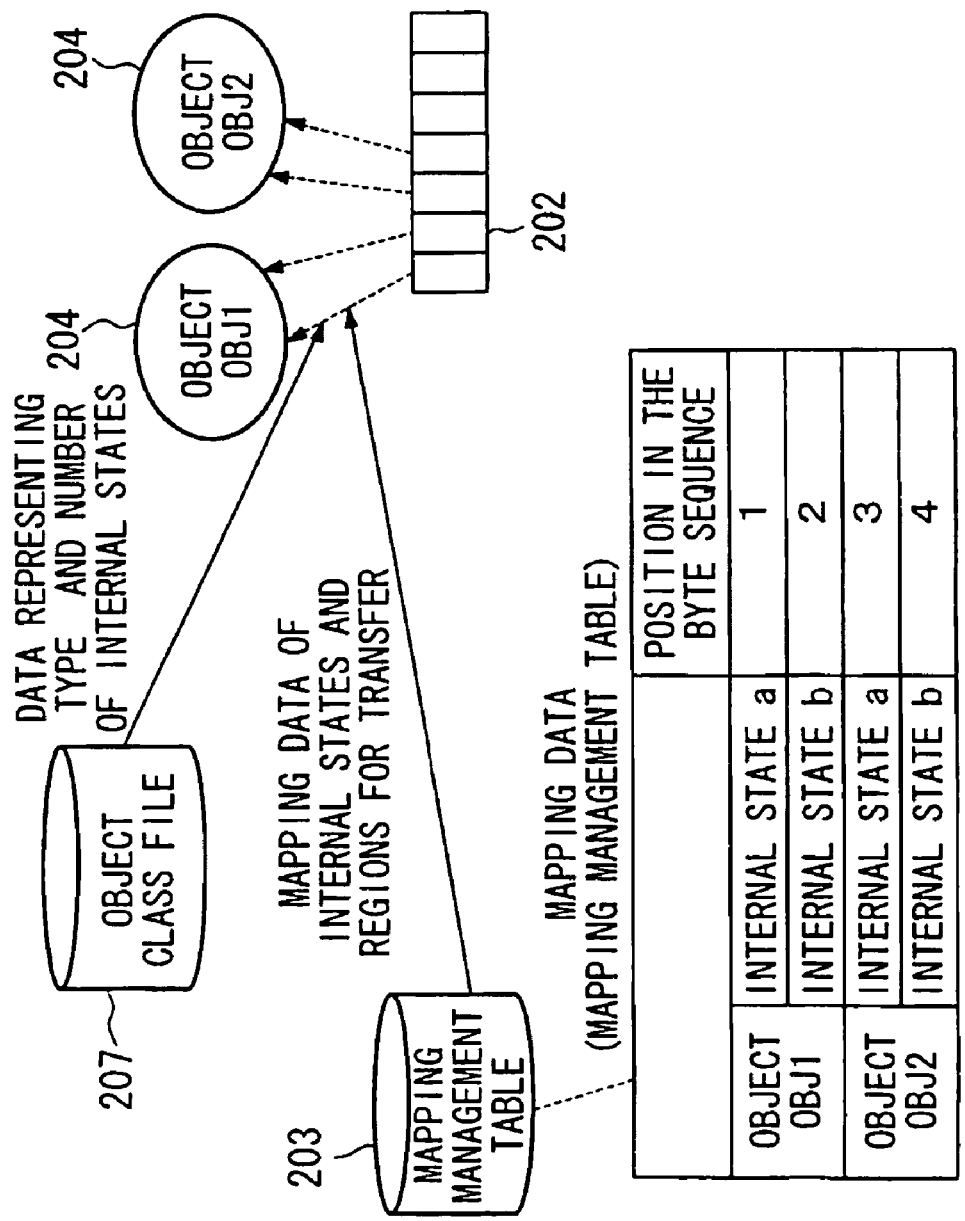
FIG. 10 is a diagram showing an object reproduction method in the first embodiment of this invention.

FIG. 10 is a diagram showing a method for reproducing an object from the mapping data of the mapping management table 203 and the byte sequence comprising the region for transfer 202 in the receiver 20.

The reproduction function 201 of the receiver 20 regularly receives the byte sequence comprising the region for transfer 104 and the mapping data of the mapping management table 103 from the transfer function 105 in the transmitter 10, and sets the region for transfer 202 and the mapping management table 203. The mapping data set in the mapping management table 203 are the object names OBJ1 and OBJ2, and positions of their internal states a and b in a region for transfer (byte sequence) 202.

The reproduction function 201 extracts data representing the type and number of the internal states of the objects OBJ1 and OBJ2 from an object class file 207 which was prepared in advance, and recreates the positions of the internal states in the region for transfer 202 from the mapping data between the internal states of the objects and the region for transfer 202, set in the mapping management table 203, and thereby reproduces the objects 204. Consequently, the objects 204 having the same states as the objects 102 in the transmitter 10 are reproduced in the receiver 20.

The above explanation of the first embodiment describes an example where there is one region for transfer 104 in the transmitter 10 and one region for transfer 202 in the receiver 20, but multiple regions for transfer may be provided. When there are multiple regions for transfer, group identification data and the like are appended to each preset group of objects, enabling them to be allocated to the appropriate regions for transfer.

Figure 11:
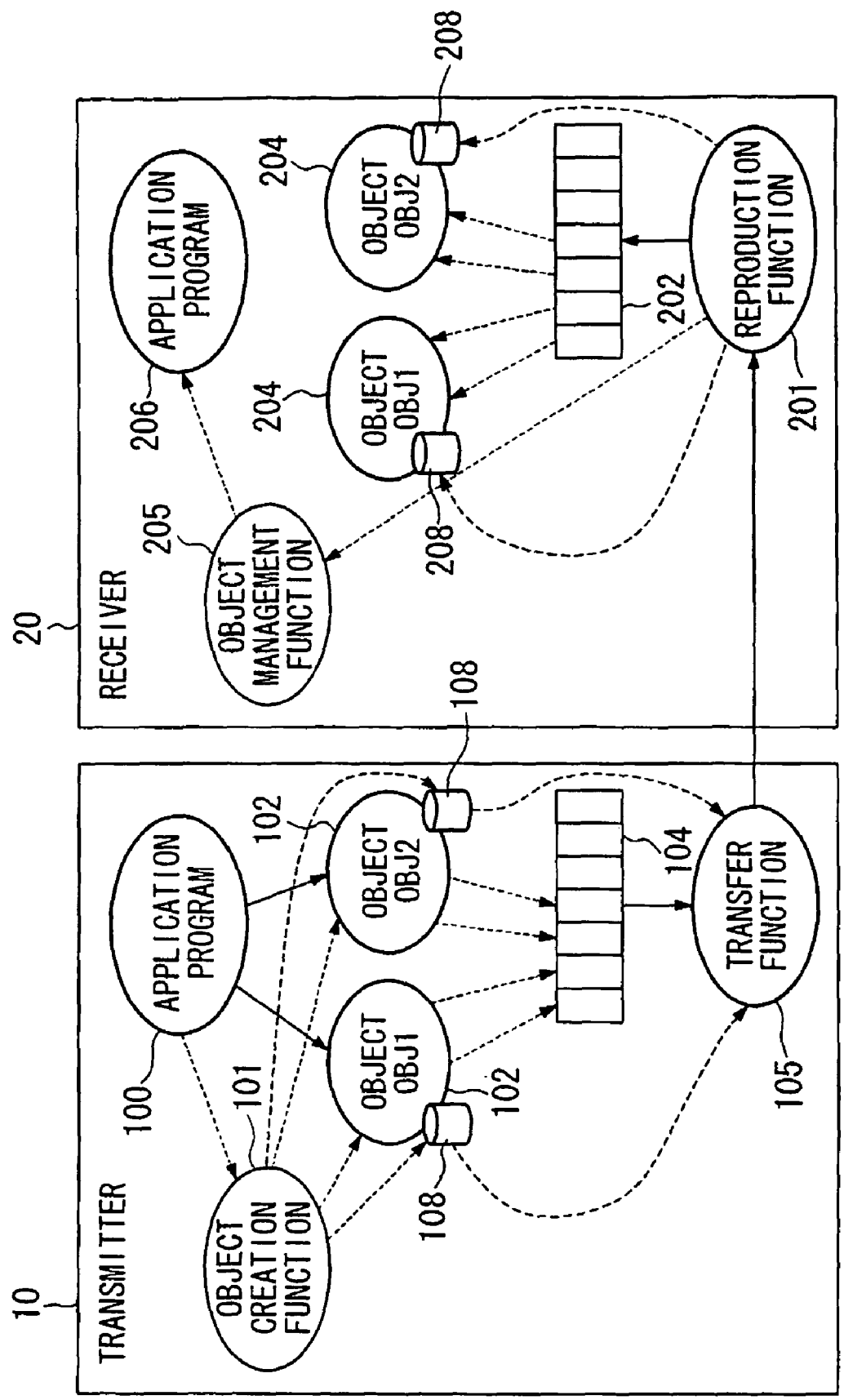
FIG. 11 is a diagram showing an example of a system constitution when mapping data is dispersed and stored among objects in the first embodiment of this invention.

In the above explanation, the mapping data are stored collectively in the mapping management table 103 and the mapping management table 203, but the mapping data may be divided and stored in correspondence with the objects. FIG. 11 is a block diagram showing one example of the system constitution in such a case; the same parts as those shown in FIG. 1 are represented by the same reference symbols and are not explained further.

In FIG. 11 the mapping data, which were stored in the mapping management tables 103 and 203 in FIG. 1, are arranged in correspondence with the individual objects 102 and 204 as mapping data 108 and 208. More specifically, the internal states a and b relating to the object OBJ1 from the mapping data shown in FIG. 2 are stored together with the object 102, which corresponds to the object OBJ1. Similarly, the internal states a and b relating to the object OBJ2 from the mapping data shown in FIG. 2 are stored together with the object 102, which corresponds to the object OBJ2. The system shown in FIG. 11 operates in the same way as that described in FIGS. 1 to 10, the only difference being that the mapping data 108 and 208, which are stored in correspondence with the individual objects, are accessed instead the mapping management tables 103 and 203.

Second Embodiment

Figure 12:
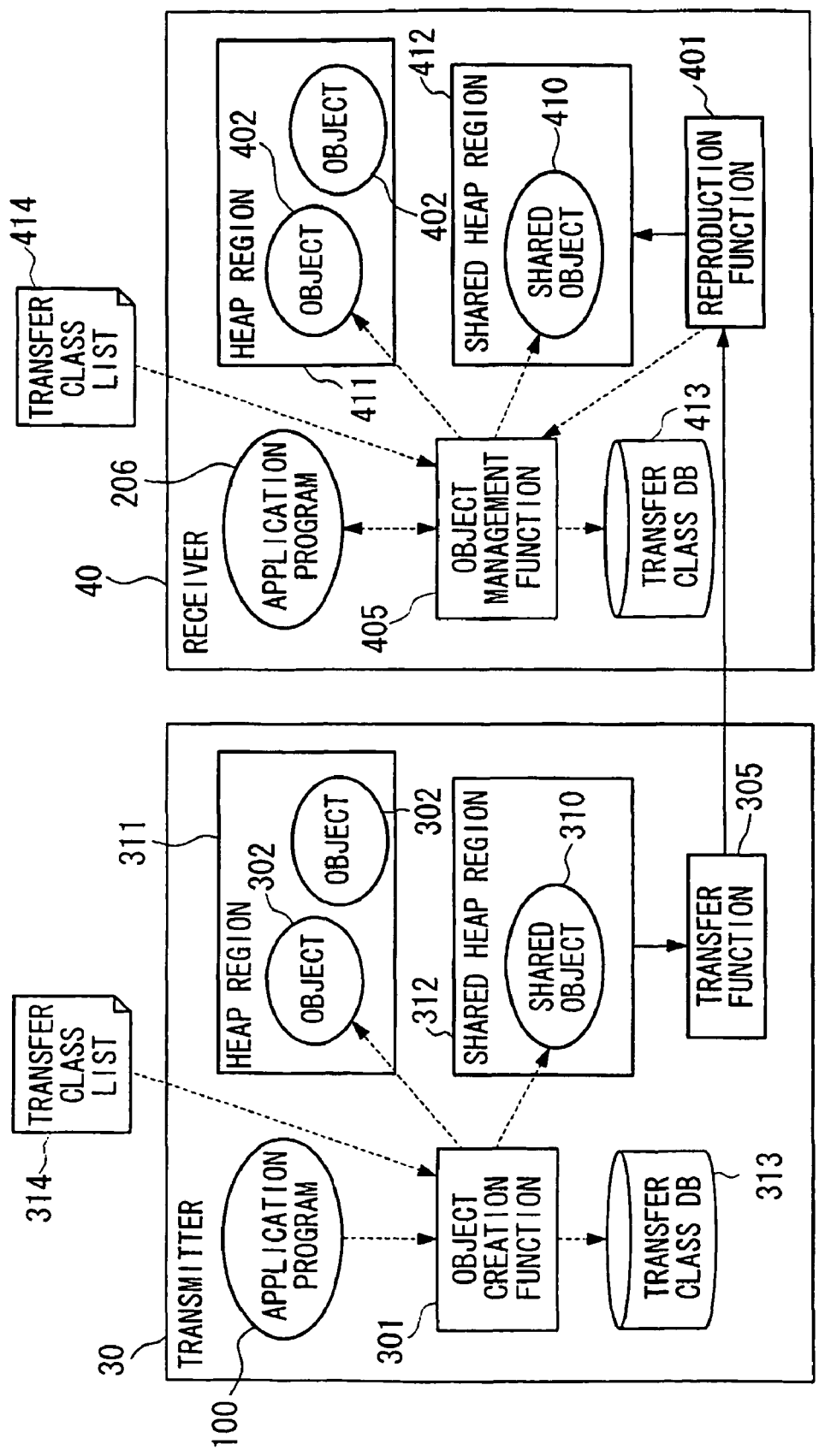
FIG. 12 is a diagram showing an example of the constitution of a system according to a second embodiment of this invention.

FIG. 12 is a diagram showing an example of the constitution of a system according to a second embodiment of this invention. The transmitter 30 and the receiver 40 correspond respectively to the transmitter 10 and the receiver 20 in the first embodiment. Accordingly, in this embodiment, components which are the same as those in the first embodiment are resented by the same reference symbols and are not explained further.

Objects 302 are unique to each of hosts, are not shared among the hosts. In contrast, a shared object 310 is shared among hosts, and is transferred between them.

The objects 302 are stored in a heap region 311, and the shared object 310 is stored in a shared heap region 312. Incidentally, the data structures of the heap region 311 and the shared heap region 312 will be explained later with reference to FIG. 15.

A transfer class database (DB) 313 is a database for storing data relating to the classes to be shared between hosts. A specific example of the structure of the transfer class DB 313 will be explained later with reference to FIG. 13.

A transfer class list 314 comprises data sent to the transmitter 30 from a user, a class number being appended to each class specified in the transfer class list 314, and stored in the transfer class DB 313.

An object creation function 301 corresponds to the object creation function 101 in the first embodiment; the object creation function 301, which will be explained in detail later, mainly has the following functions. The object creation function 301 sets the transfer class list 314, input by the user, in the transfer class DB 313. Furthermore, when a command to create an object is received from the application program 100, the object creation function 301 searches the transfer class DB 313 and determines whether the class to be created is specified as a transfer class; in accordance with the result of this determination, the object creation function 301 creates the object in the heap region 311 or in the shared heap region 312. Moreover, when a command to manipulate an object (to set or get the internal state of the object) is received from the application program 100, the object creation function 301 determines whether the object to be manipulated is stored in the shared heap region 312; in accordance with the result of this determination, the object creation function 301 manipulates the object 302 in the heap region 311 or the shared object 310 in the shared heap region 312, and returns the result of the manipulation to the application program 100.

A transfer function 305 corresponds to the transfer function 105 in the first embodiment, and regularly transfers the entire shared heap region 312, or part of the shared heap region 312 containing the updated object, to the receiver 40.

A reproduction function 401 corresponds to the reproduction function 201 in the first embodiment, and arranges all or part of the shared heap region 312, received from the transmitter 30, to a shared heap region 412, and creates a shared object 410 having the same states as the shared object 310 at the transmitter 30 in the shared heap region 412. The reproduction function 401 notifies an object management function 405 of data relating to the reproduced shared object 410.

The object management function 405 has the same functions as the object creation function 301 on the transmitter 30 side, and in addition, receives data relating to the reproduced shared object 410 from the reproduction function 401, and notifies the application program 206 of the reference to this data.

The object 402, the heap region 411, the transfer class DB 413, and the transfer class list 414, are respectively the same as the object 302, the heap region 311, the transfer class DB 313, and the transfer class list 314 on the transmitter 30 side.

Figure 13:
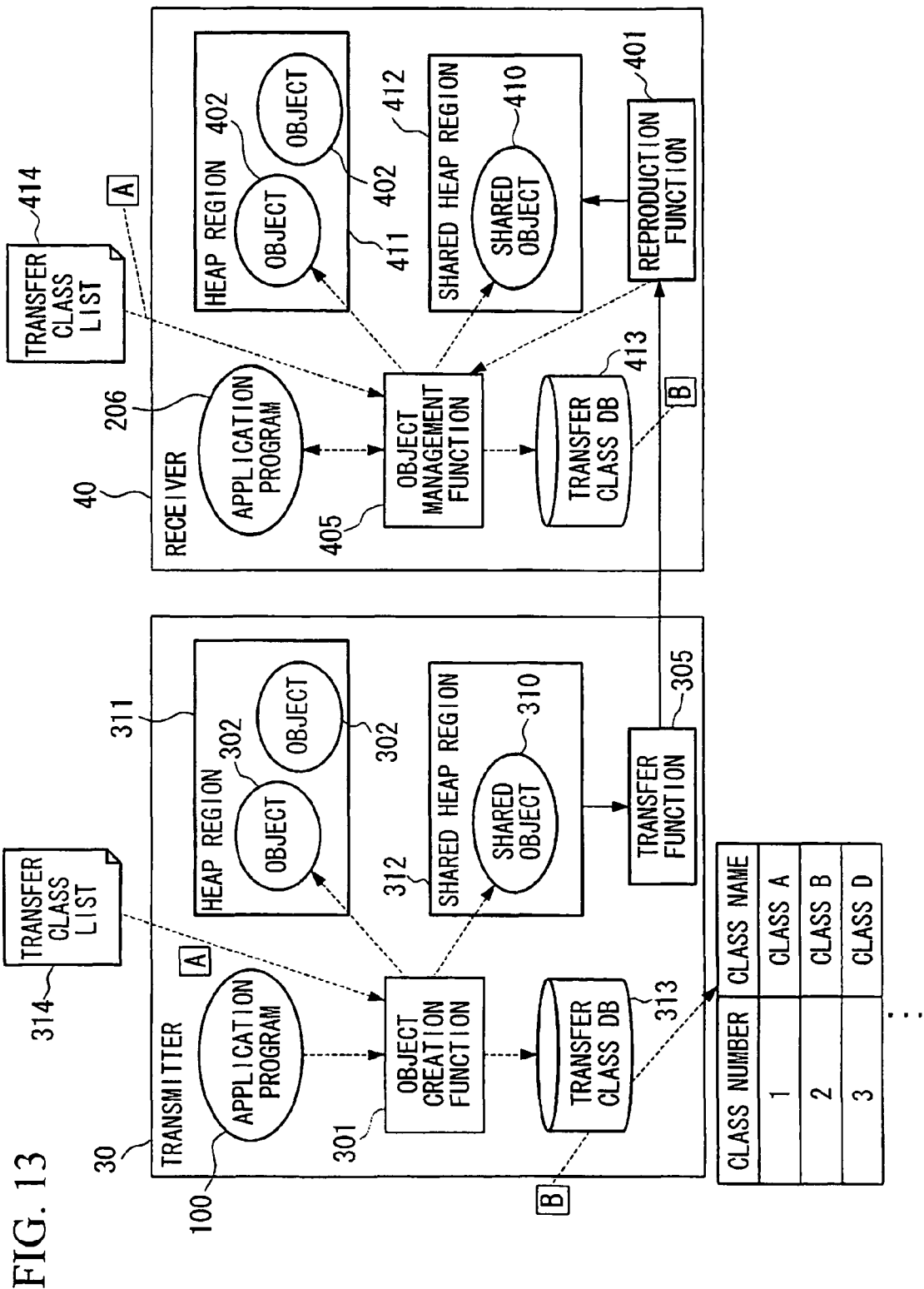
FIG. 13 is a diagram showing an example of a transfer class specification process in the second embodiment of this invention.
Figure 14:
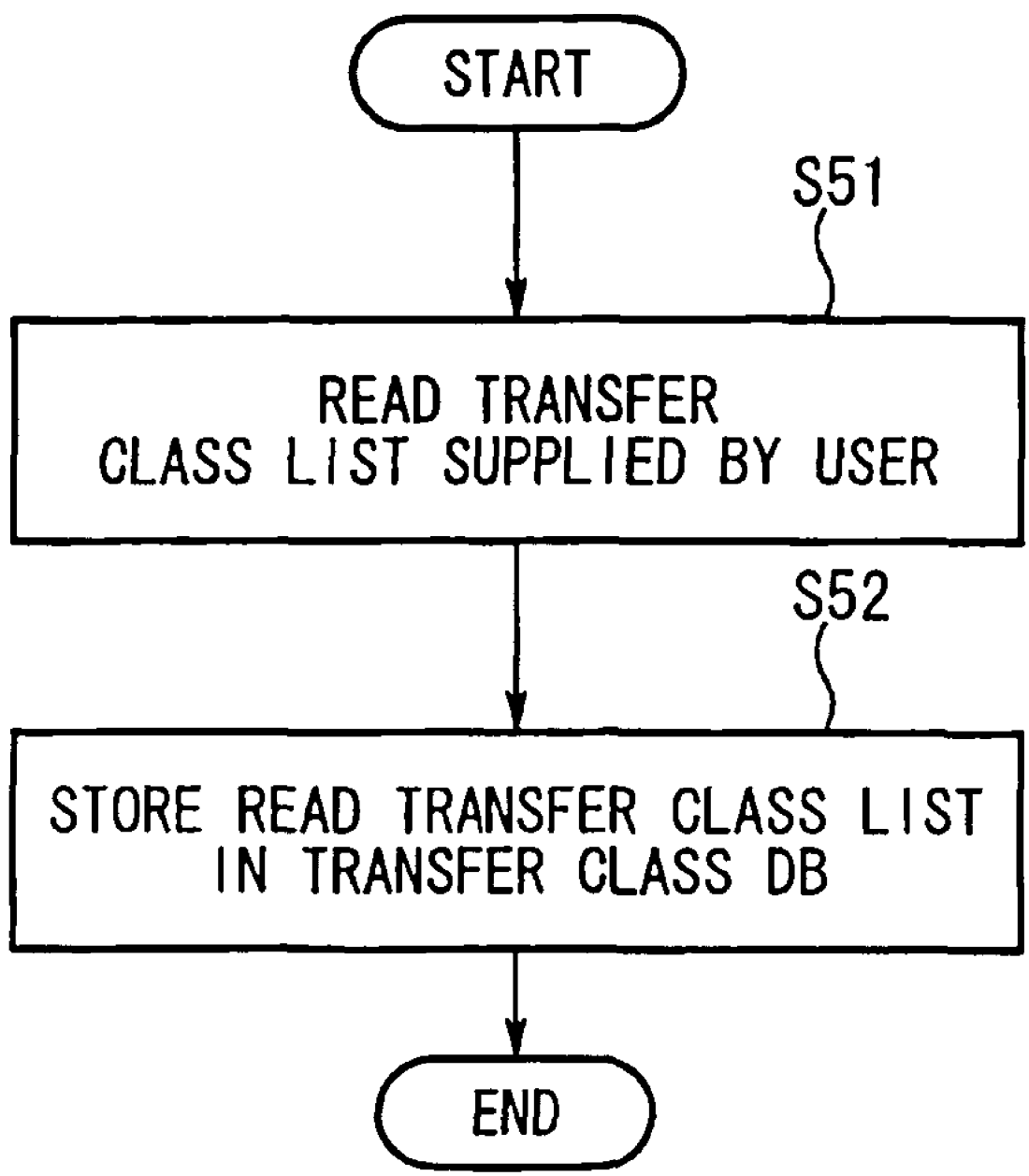
FIG. 14 is a flowchart of a transfer class specification process in the second embodiment of this invention.

FIG. 13 shows an example of processing in a method for specifying the transfer class according to an embodiment of this invention, and FIG. 14 is a processing flowchart of the transfer class specifying method.

FIG. 13 also shows the specific structure of the transfer class DB 313. The transfer class DB 313 stores pairs of data comprising the name of the class which is to be transferred between hosts, and the class number, which is assigned to the class name by the object creation function 301 at the time of specifying the transfer class.

The flow of the processing will be explained with reference to FIGS. 13 and 14.

(A) Reading of Transfer Class List

When the transmitter 30 incorporating the virtual machine is activated, the object creation function 301 reads the transfer class list 314 supplied by the user. Similarly, when the receiver 40 incorporating the virtual machine is activated, the object management function 405 reads the transfer class list 414 supplied by the user (step S51).

(B) Storing the Transfer Class List in the Transfer Class DB

The object creation function 301 stores the transfer class list 314 it has read in the transfer class DB 313. Similarly, the object management function 405 stores the transfer class list 414 it has read in the transfer class DB 413. At this time, the object creation function 301 and the object management function 405 appends a unique class number to each of the class names specified by the transfer class list 314 and the transfer class list 414 (step S52).

Figure 15:
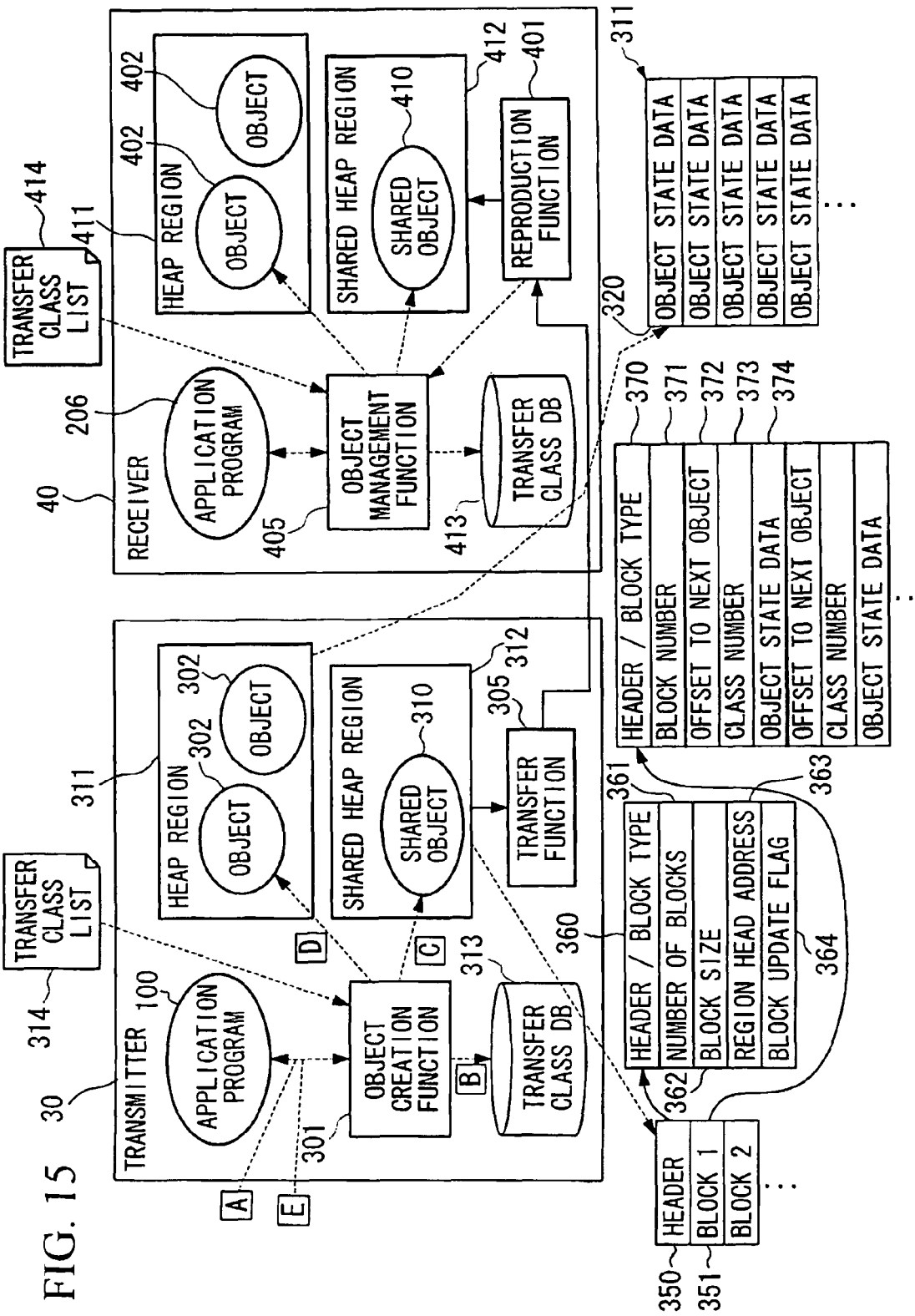
FIG. 15 is a diagram showing an example of an object creation process in the second embodiment of this invention.
Figure 16:
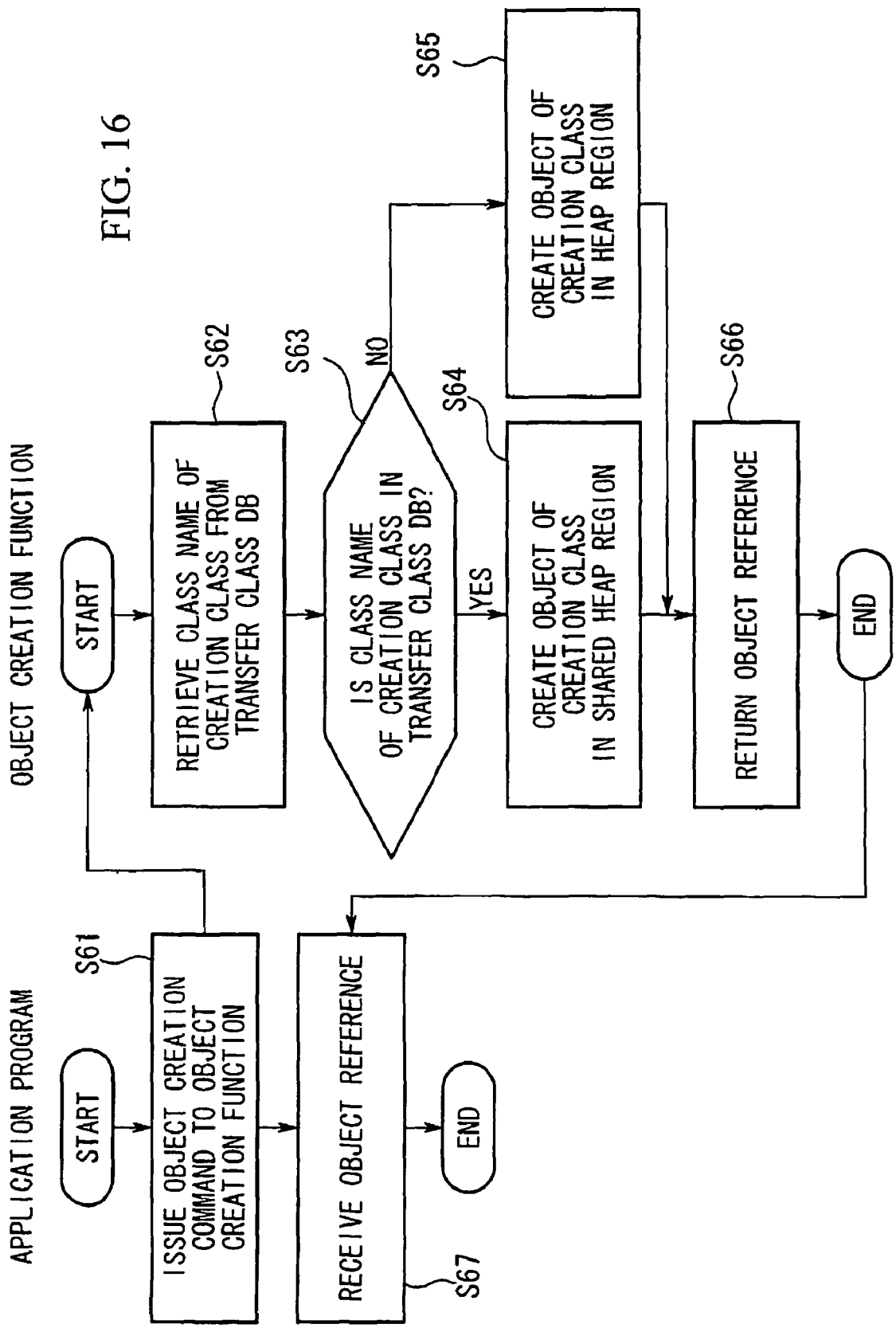
FIG. 16 is a flowchart of an object creation process in the second embodiment of this invention.

FIG. 15 is a diagram showing an example of an object creation process in the embodiment according to this invention, and FIG. 16 is a flowchart of the object creation process.

FIG. 15 also shows a specific example of the structure of the heap region 311 and the shared heap region 312.

The heap region 311 stores only object state data 320 (showing the states of the individual objects 302) for each object. In contrast, the shared heap region 312 comprises one header 350 and a plurality of blocks 351. Since each of the blocks 351 has the same structure, FIG. 15 shows the detailed structure of a representative block 1.

The header 350 comprises a header/block type 360, the number of blocks 361, a block size 362, a region head address 363, and a block update flag 364. Data (fixed value) for showing whether the subsequent region of the header/block type 360 is a header 350 or a block 351 is stored in the header/block type 360. The number of blocks 361 shows the number of blocks in the shared heap region 312. To facilitate explanation in this embodiment, fixed values are stored as the number of blocks 361 (i.e. the size of the shared heap region 312 does not vary), but there are no restrictions on this. The block size 362 shows the size of each block 351. To facilitate explanation, the sizes of the blocks 351 in this embodiment are all the same, but there is no restriction on this. The region head address 363 stores the head address of the shared heap region 312. That is, the head address of the shared heap region 312 is stored as the region head address 363 on the transmitter 30 side, and the head address of the shared heap region 412 is stored as the region head address 363 on the receiver 40 side. The block update flag 364 is a collection of flags provided in correspondence with the header 350 and the blocks 351, each flag showing whether its corresponding region (the header 350 or the individual blocks 351) has been updated.

Each block 351 has a header/block type 370 and a block number 371 at its head, and these are followed by data relating to each object (hereinafter termed "object data"), stored for each object. In the same manner as the header/block type 360, the header/block type 370 stores data (fixed value) showing whether the subsequent region is a header 350 or a block 351. Of course, the individual fixed values stored in the header/block type 370 are set to different values from those stored in the header/block type 360. The block numbers 371 are unique numbers assigned to each block.

The object data comprises offset to next object 372, class number 373, and object state data 374. The offset to next object 372 shows the size of each object, and the head address of the object data relating to the next object can be obtained by adding the offset to next object 372 to the head address of the object data relating to each object (i.e. to the position where the offset to next object 372 is stored). In the memory following the object data relating to the last object in each block, a "0" is stored in the region corresponding to the offset to next object 372, making it possible to determine that there is no object in that memory. The class number 373 stores a class number (see FIG. 13), applied at the time of specifying the transfer class, representing the class to which the object belongs. The object state data 374 stores the state of each object in the same way as the object state data 320 comprising the heap region 311.

The flow of the processing will be explained based on FIGS. 15 and 16.

(A) Object Creation Command

The application program 100 commands the object creation function 301 to create an object. For example, when the class name of the class to be created is "Class_A", a bytecode of "new Class_A" can be used to command the object creation function 301 to create an object (step S61).

(B) Determining Whether it is Transfer Class

The object creation function 301 retrieves the transfer class DB 313 (step S62) and determines whether or not the class name of the class to be created is contained in the transfer class DB 313 (step S63). When the class name is contained in the transfer class DB 313, processing proceeds to (C). On the other hand, when the class name is not contained in the transfer class DB 313, the processing proceeds to (D).

(C) Creation of Object in Shared Heap Region

The object creation function 301 creates an object of the class to be created in the shared heap region 312 (step S64). Firstly, the object creation function 301 determines a region for storing the object in the shared heap region 312. The object creation function 301 sequentially traces the offset to next object 372 in the blocks 351 from the head block (block "1" in FIG. 15), determines the next address of object data relating to the last object in the blocks 351, and makes this address the head address of the object data relating to the object to be created. Next, as described in the first embodiment, the object creation function 301 determines the number and type of the internal states of the object to be created, and thereby determines the size required for the object to be created., and sets the offset to next object 372 based on the size obtained. The object creation function 301 extracts the class number corresponding to the class name of the class to be created from the transfer class DB 313, and sets this as the class number 373. When the empty region remaining in the block 351 being examined is insufficient for storing the object to be created, the object creation function 301 repeats this manipulation until it finds a block with the necessary empty region. Thereafter, processing proceeds to (E).

(D) Creation of Object in Heap Region

The object creation function 301 creates the object of the class to be created in the heap region 311 (step S65). That is, the object creation function 301 secures a new region for the object state data 320 in the heap region 311. The processing then proceeds to (E).

(E) Return Object Reference

As in the first embodiment, the object creation function 301 returns the object reference to the application program 100 (step S66). The application program 100 receives the object reference from the object creation function 301 (step S67).

Figure 17:
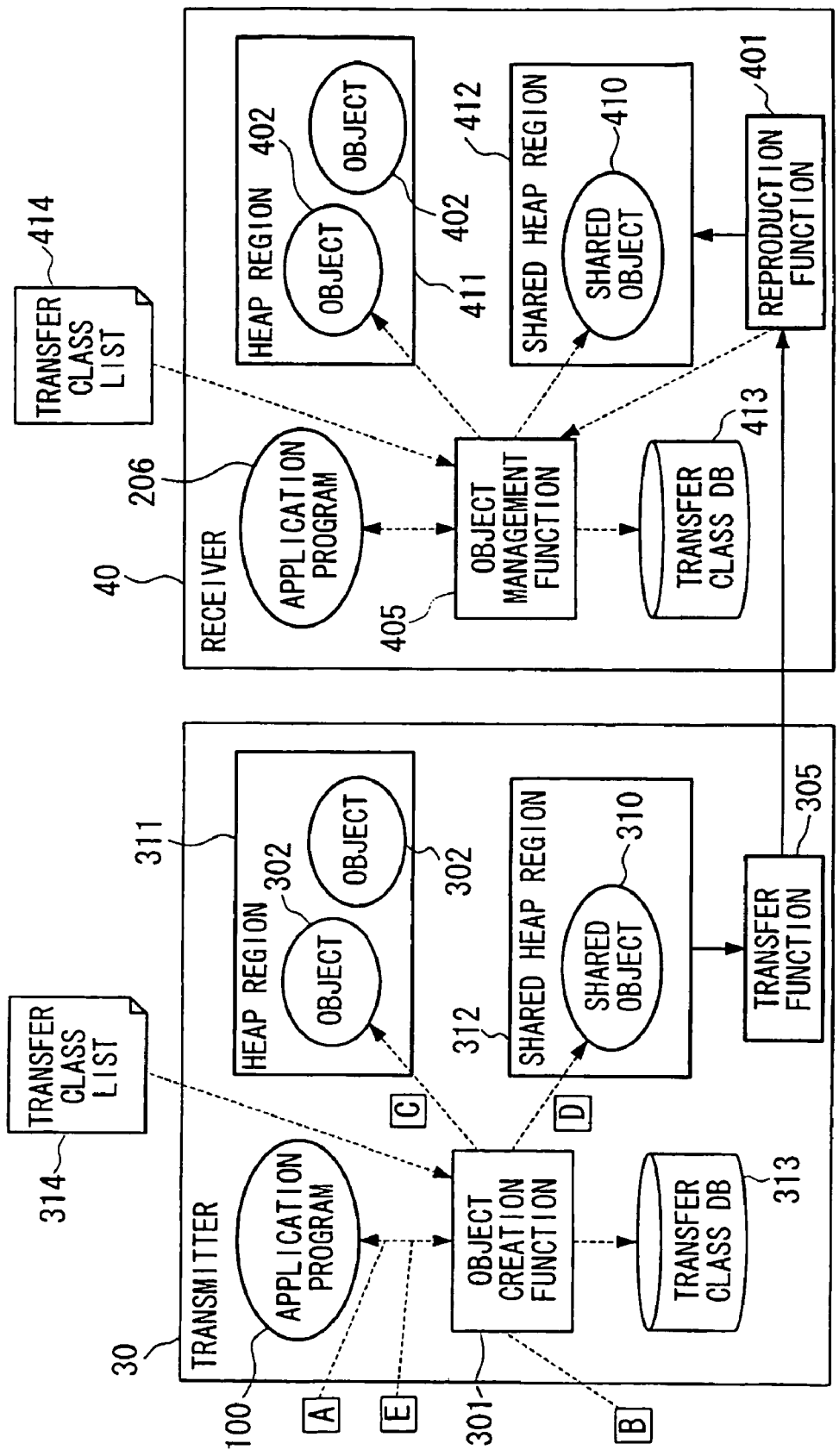
FIG. 17 is a diagram showing an example of an object manipulation process in the second embodiment of this invention.
Figure 18:
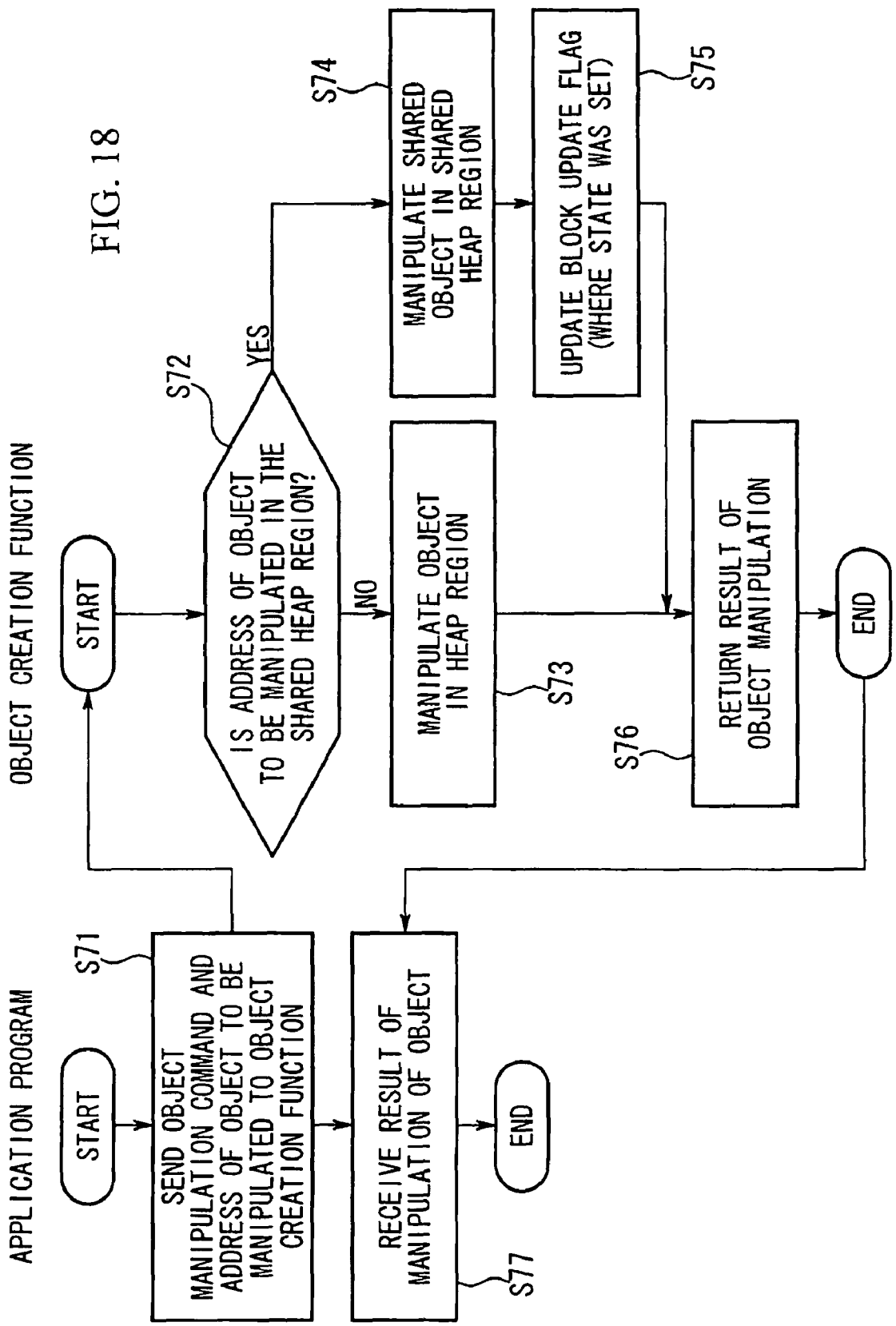
FIG. 18 is a flowchart of an object manipulation process in the second embodiment of this invention.

FIG. 17 is a diagram showing an example of an object manipulation process in an embodiment according to this invention and FIG. 18 is a flowchart of the object manipulation process. The flow of the processing will be explained based on FIGS. 17 and 18.

(A) Object Manipulation Command

The application program 100 commands the object creation function 301 to manipulate an object (e.g. to increment the internal state a of the object OBJ1). At the same time, the application program 100 sends the address of the object to be manipulated to the object creation function 301 (step S71).

(B) Check Whether the Address of the Object to be Manipulated is in the Shared Heap Region The object creation function 301 checks whether the address of the object to be manipulated is in the shared heap region 312 (step S72). Processing proceeds to (C) when the address is outside the shared heap region 312, and proceeds to (D) when the address is inside the shared heap region 312.

(C) Manipulation of Object

In accordance with the command from the application program 100, the object creation function 301 manipulates the object state data 320 corresponding to the object 302 to be manipulated in the heap region 311 based on the address of the object to be manipulated (step S73). Thereafter, the processing proceeds to (E).

(D) Manipulating the Object and Setting the Block Update Flag

Based on the address of the object to be manipulated, the object creation function 301 manipulates the object state data 374 in the object data corresponding to the shared object 310 to be manipulated in the shared heap region 312, in accordance with the command from the application program 100 (step S74). Next, the object creation function 301 calculates the block number of the block in the shared heap region 312 where the shared object 310 to be manipulated is stored. If the address of the shared object is x, the head address of the shared heap region 312 (i.e. the head address of the first block 351) is y, and the block size 362 is $2^n$, then the block number= $(x-y)>>n$. Incidentally, ">>n" expresses a right shift computation of n bits. Then, when the object is to be manipulated by setting., the object creation function 301 sets the flag among the flags comprising the block update flag 364, which corresponds to the calculated block number. Since the fact that the block update flag 364 has been updated indicates that the content of the header 350 has been set, the object creation function 301 also sets, from among the flags comprising the block update flag 364, the flag which corresponds to the header 350 (step S75). Thereafter, the processing proceeds to (E).

(E) Notification of the Object Manipulation Result

The object creation function 301 returns the result of the manipulation of the object to the application program 100. In particular, when the manipulation of the object comprises obtaining the state of the object, the object creation function 301 returns the internal state of the object which was manipulated to the application program 100 (step S76). The application program 100 receives the internal state of this object (step S77).

Figure 19:
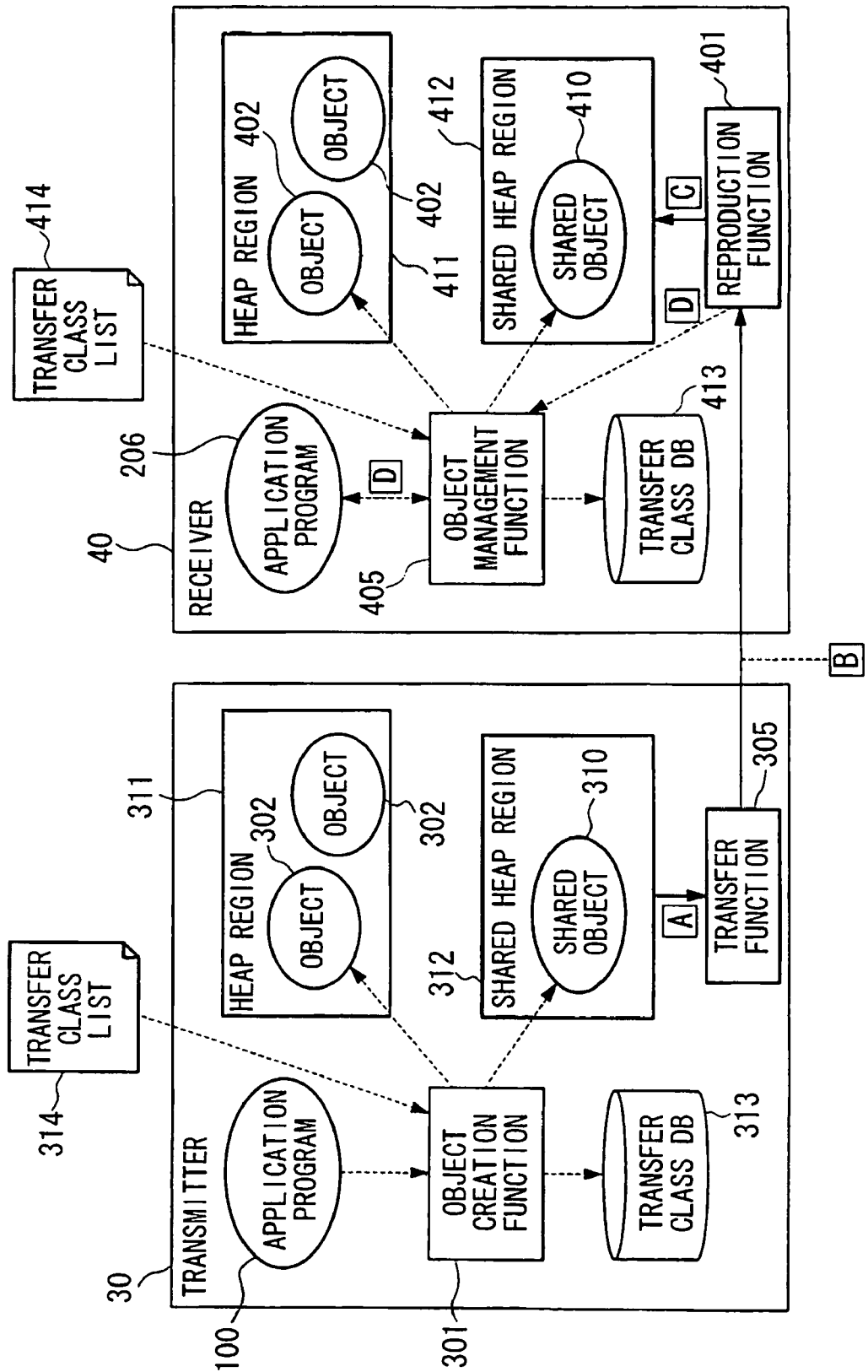
FIG. 19 is a diagram showing examples of object transfer and reproduction processes in the second embodiment of this invention.
Figure 20:
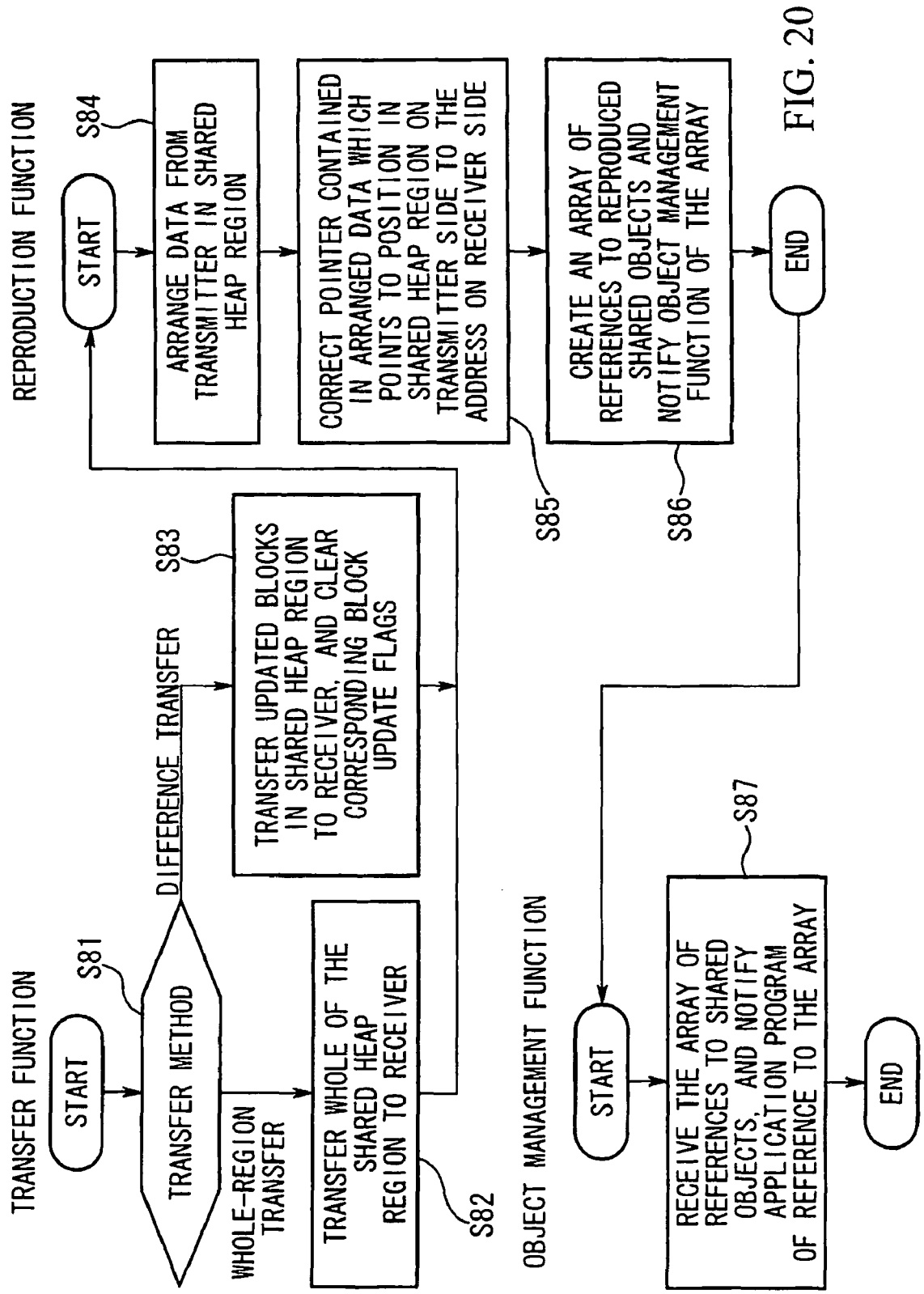
FIG. 20 is a flowchart of object transfer and reproduction processes in the second embodiment of this invention.

FIG. 19 shows examples of object transfer and reproduction processes for the shared heap region 312 in the embodiment according to this invention, and FIG. 20 is a flowchart of the object transfer and reproduction processes. The flow of the processing will be explained based on FIGS. 19 and 20.

(A) Transfer Command of Shared Heap Region

The transfer function 305 cyclically starts transfer processing and obtains the head address of the shared heap region 312.

(B) Transfer of Shared Heap Region

There are two types of transfer method: whole region transfer and difference transfer: the user selects the transfer method he wishes to use beforehand at the time of activating the transmitter 30, and instructs it to the transmitter 30. Then, the transfer function 305 determines the transfer method (step S81). In the case of whole-region transfer, the transfer function 305 reads the shared heap region 312, and transfers the whole of this region to the reproduction function 401 of the receiver 40 (step S82). In the case of difference transfer, the transfer function 305 refers to the block update flag 364 in the header 350 of the shared heap region 312, reads the header 350 and/or the blocks 351 with set flags from the shared heap region 312, transfers them to the reproduction function 401 of the receiver 40, and clears the flags corresponding to the header 350 and/or the blocks 351 which have been transferred (step S83).

(C) Reproduction of Shared Heap Region

The reproduction function 401 arranges the data, received from the transmitter 30, to the shared heap region 412 (step S84). On the receiver 40 side, the address of the shared heap region is different from that on the transmitter 30 side. Therefore, the reproduction function 401 refers to the region head address 363 in the header 350 of the shared heap region 412 to extract the head address of the shared heap region 412, and in addition, refers to the region head address 363 in the header 350 on the transmitter 30 side, arranged in the shared heap region 412, and extracts the head address of the shared heap region 312. Subsequently, the reproduction function 401 calculates the difference between the two addresses, and, from among the data arranged in the shared heap region 412 (specifically, pointers identifying other objects in the object state data 374), the reproduction function 401 collects the pointer which points to the shared heap region 312 on the transmitter 30 side to the address on the receiver 40 side (i.e. the address in the shared heap region 412). Furthermore, the reproduction function 401 nullifies any pointers pointing outside the shared heap region 312 on the transmitter 30 side (step S85). A pointer pointing outside the shared heap region 312 may be identifying a position in the heap region 311. The application program 206 post-processes the nullified pointer as required.

(D) Notification of Object Reproduction

The reproduction function 401 creates an array of the references to the reproduced shared objects 410( and notifies the object management function 405 of the array (step S86). The object management function 405 receives the array of the references, and notifies the application program 206 of the reference to the array as reproduced data (step S87). The application program 206 performs post-reproduction processing where necessary.

Incidentally, in the case of whole-region transfer, the process of updating the block update flags (step S75 in FIG. 18) may be omitted from the object manipulation processing described in FIGS. 17 and 18.

Third Embodiment

Figure 21:
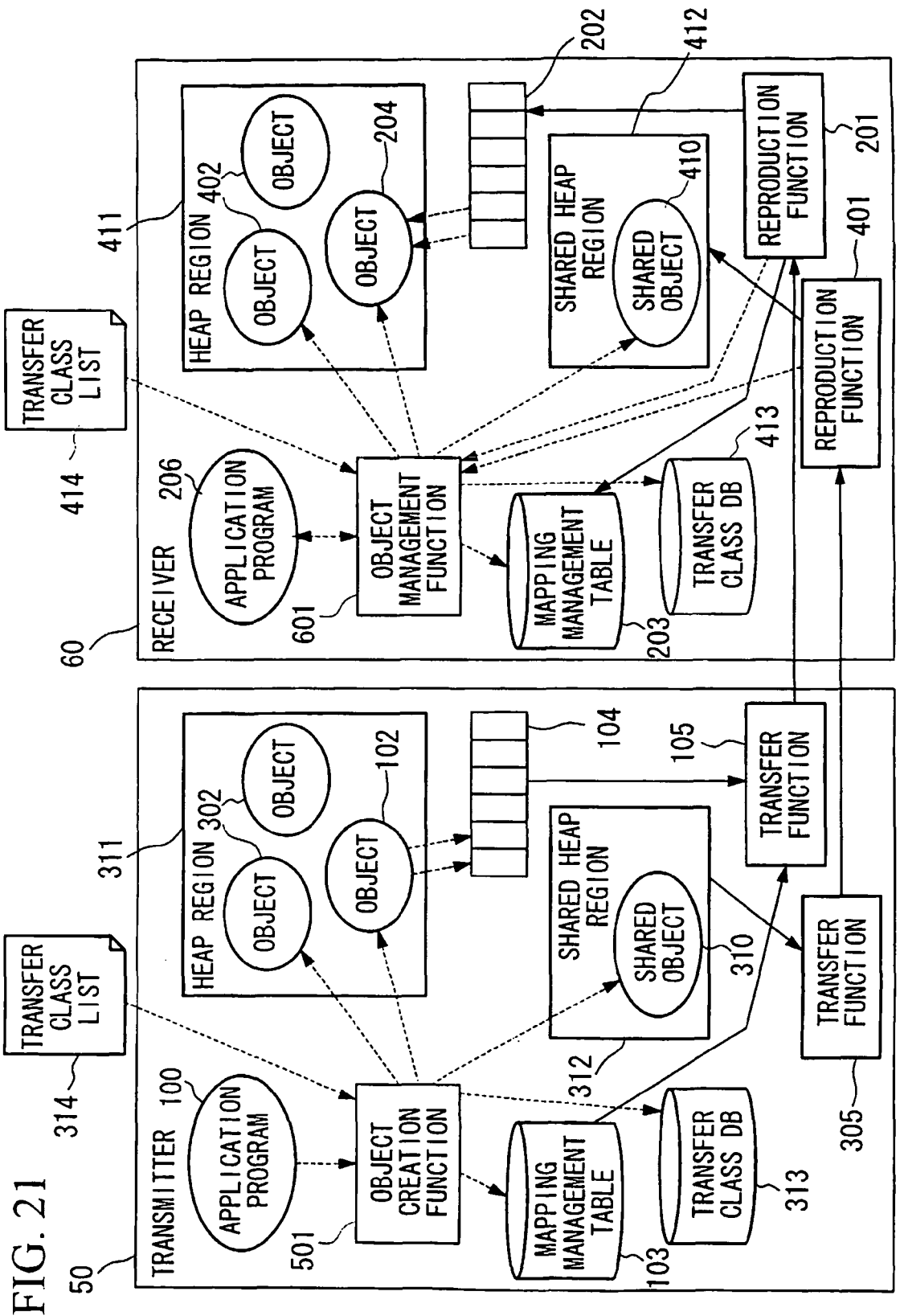
FIG. 21 is a diagram showing an example of the constitution of a system according to a third embodiment of this invention.

FIG. 21 is a diagram showing an example of the constitution of a system according to a third embodiment of this invention, combining the first and second embodiments. The transmitter 50 comprises the constituent elements of the transmitter 10 and the transmitter 30, and the receiver 60 comprises the constituent elements of the receiver 20 and the receiver 40. In FIG. 21, components identical to those in the first and second embodiments are represented by the same reference symbols and are not explained further.

An object creation function 501 is realized by combining the object creation function 101 of the first embodiment and the object creation function 301 of the second embodiment. The application program 100 specifies to the object creation function 501 beforehand whether the object creation function 501 should operate according to the first embodiment or the second embodiment. Similarly, an object creation function 601 is realized by combining the object management function 205 of the first embodiment and the object management function 405 of the second embodiment. The application program 206 specifies to the object management function 601 beforehand whether the object management function 601 should operate according to the first embodiment or the second embodiment. In addition, the objects 102 and 204 to be transferred, which were described in the first embodiment, are stored in the heap regions 311 and 411 respectively. Next, the differences in each process between the object state transfer device described in the first embodiment when used singly, and the object state transfer device described in the second embodiment when used singly, will be explained.

The method for specifying the transfer class is a process used only in the second embodiment, and has the same processing flow as that described in FIGS. 13 and 14.

Both the first and second embodiments comprise object creation and manipulation processes, and the flows of these processes comply with their respective embodiments.

Both the first and second embodiments comprise object transfer and reproduction processes, and the flows of these processes comply with their respective embodiments. That is, the transfer function 305 transfers all or part of the shared heap region 312 to the reproduction function 401 in compliance with a pre-selected transfer method: the reproduction function 401 receives this, and reproduces the shared object 410 in the shared heap region 412. The transfer function 105 transfers the region for transfer 104 and the mapping management table 103 to the reproduction function 201, and the reproduction function 201 reproduces the region for transfer 202 and the mapping management table 203.

Object deletion processing belongs only to the first embodiment, and the processing flow complies with that embodiment.

It is possible to combine the transfer function 105 and the transfer function 305 into a single transfer function, and to combine the reproduction function 201 and the reproduction function 401 into a single reproduction function. When doing so, it is necessary to determine on the receiver 60 side whether the data transferred from the transmitter 50 complies with the first embodiment or the second embodiment. To do this, when the transmitter 50 transfers data to the receiver 60, it appends data showing whether the data complies with the first or second embodiment, and the receiver 60 performs an operation according to the first or second embodiment based on the appended data.

The processes of the embodiments described above can be realized by a computer (data processing device) and a software program; the program can be stored on an appropriate recording medium such as a computer-readable portable memory, a semiconductor memory, or a hard disk, and the computer can to execute the program by reading it from the recording medium.

Since the hosts also function as transmitters and receivers they comprise components which function as transmitters and receivers. At a given moment, the hosts are functioning either as transmitters or receivers, and for this reason, the above embodiments describe one host functioning as a transmitter and one functioning as a receiver.

What is claimed is:

1. An object state transfer method in a data processing device comprising an application program, and a plurality of objects having internal states, which can be manipulated from the application program, comprising the steps of:

determining whether an object is shared among a plurality of data processing devices;

when the object is shared among the plurality of data processing devices, storing the object as a shared object in a shared heap region;

when the object is not shared among the plurality of data processing devices, storing the object in a heap region;

transferring the states of shared objects to another data processing device by transmitting the shared heap region in unaltered form to the other data processing device, specifying beforehand a class to be transferred to the other data processing device as a transfer class;

when a command to create a new object has been issued by the application program, determining whether a class to be created, specified by the application program, is contained in the transfer class;

when the class to be created is not contained in the transfer class, creating a new object in the heap region; and when the class to be created is contained in the transfer class, creating a new shared object in the shared heap region.

2. An object state transfer program, which allows a computer to execute the object state transfer method as described in claim 1.

3. A recording medium for storing an object state transfer program which allows a computer to execute the object state transfer method as described in claim 1.

4. An object state transfer method in a data processing device comprising an application program, and a plurality of objects having internal states, which can be manipulated from the application program, comprising the steps of:

determining whether an object is shared among a plurality of data processing devices;

when the object is shared among the plurality of data processing devices, storing the object as a shared object in a shared heap region;

when the object is not shared among the plurality of data processing devices, storing the object in a heap region;

transferring the states of shared objects to another data processing device by transmitting the shared heap region in unaltered form to the other data processing device, determining, when the application program has issued a command to manipulate an internal state of an object, whether the object to be manipulated is stored in the shared heap region, based on an address of the object to be manipulated supplied by the application program, and determining whether the manipulation comprises setting the internal state; and when the object to be manipulated is stored in the shared heap region and the manipulation comprises setting the internal state, setting a flag showing that, among a plurality of blocks comprising the shared heap region, the block where the object to be manipulated is stored has been updated.

5. The object state transfer method as described in claim 4, wherein, among the plurality of blocks, only the block whose flag is set to show that its corresponding block has been updated is transmitted to the other data processing device.

6. An object state transfer program, which allows a computer to execute the object state transfer method as described in claim 5.

7. A recording medium for storing an object state transfer program which allows a computer to execute the object state transfer method as described in claim 5.

8. An object state transfer program, which allows a computer to execute the object state transfer method as described in claim 4.

9. A recording medium for storing an object state transfer program which allows a computer to execute the object state transfer method as described in claim 4.

10. An object state transfer method in a data processing device comprising an application program, and a plurality of objects having internal states, which can be manipulated from the application program, comprising the steps of:

determining whether an object is shared among a plurality of data processing devices;

when the object is shared among the plurality of data processing devices, storing the object as a shared object in a shared heap region;

when the object is not shared among the plurality of data processing devices, storing the object in a heap region;

transferring the states of shared objects to another data processing device by transmitting the shared heap region in unaltered form to the other data processing device, wherein another data processing device, which reproduces the shared objects, performs the steps of:

receiving the shared heap region, and arranging the transferred shared heap region to a shared heap region in the other data processing device;

calculating the difference between an address of the transferred shared heap region which is contained in the transferred shared heap region, with an address of the shared heap region in the other data processing device which is contained in the shared heap region in the other data processing device;

determining whether a pointer in a shared object contained in the transferred shared heap region points to a position in the transferred shared heap region;

correcting the pointer, based on the difference between the addresses, when the pointer points to a position in the transferred shared heap region; and nullifying the pointer, when the pointer points to a position outside the transferred shared heap region.

11. An object state transfer program, which allows a computer to execute the object state transfer method as described in claim 10.

12. A recording medium for storing an object state transfer program which allows a computer to execute the object state transfer method as described in claim 10.

13. An object state transfer device in a data processing device comprising an application program, and a plurality of objects having internal states, which can be manipulated from the application program, comprising:

a shared heap region which stores, from among the plurality of objects, objects which are shared among a plurality of data processing devices, as shared objects;

a heap region which stores, from among the plurality of objects, objects which are not shared among the plurality of data processing devices; and a transfer unit which transfers internal states of the shared objects to another data processing device by transmitting the shared heap region in unaltered form to the other data processing device, wherein the shared heap region comprises a plurality of blocks for storing the shared objects, and flags showing whether each of the plurality of blocks has been updated, and wherein the object state transfer device further comprises:

a transfer class memory unit which stores a transfer class to be transferred to the other data processing device;

an object creation unit which, in response to a command from the application program to create a new object, together with the specification of a class to be created, creates a new object in the heap region in the case when the command specifies a class not contained in the transfer class as the class to be created, and creates a new shared object in the shared heap region when the command specifies a class already contained in the transfer class as the class to be created; and a unit which, in response to a command from the application program to manipulate an internal state of an object, together with an address of the object to be manipulated, detects the command to set an internal state of an object in the shared heap region, based on the address of the object to be manipulated and the content of the manipulation, and which sets a flag which corresponds to the block where the object to be manipulated is stored, and wherein the transfer unit transfers the whole of the shared heap region, or only the blocks whose flags are set, to the other data processing device, in compliance with a predetermined transfer method.

14. An object state transfer device in a data processing device comprising an application program, and a plurality of objects having internal states, which can be manipulated from the application program, comprising:

a shared heap region which stores an address of the shared heap region itself, and objects, from among the plurality of objects, which are shared among a plurality of data processing devices, as shared objects;

a heap region which stores, from among the plurality of objects, objects which are not shared among the plurality of data processing devices;

a reproduction unit for reproducing the shared objects which receives a shared heap region transferred from another data processing device and arranges the transferred shared heap region to its own shared heap region, calculates the difference between an address of the transferred shared heap region and an address of its own shared heap region, and, among pointers in shared objects contained in the transferred shared heap region, corrects a pointer which points to a position in the transferred shared heap region, based on the difference in the addresses, and nullifies a pointer which points to a position outside the transferred shared heap region; and an object management unit which notifies the application program of data relating to the reproduced shared object.

* * * * *